(12) United States Patent
Koul et al.

(10) Patent No.: US 11,831,073 B2
(45) Date of Patent: Nov. 28, 2023

(54) BROADBAND METAMATERIAL ENABLED ELECTROMAGNETIC ABSORBERS AND POLARIZATION CONVERTERS

(71) Applicant: Synergy Microwave Corporation, Paterson, NJ (US)

(72) Inventors: Shiban K. Koul, Delhi (IN); Ajay Kumar Poddar, Elmwood Park, NJ (US); Sukomal Dey, Palakkad District (IN); Ulrich L. Rohde, Upper Saddle River, NJ (US)

(73) Assignee: Synergy Microwave Corporation, Paterson, NJ (US)

( * ) Notice: Subject to any disclaimer, the term of this patent is extended or adjusted under 35 U.S.C. 154(b) by 0 days.

(21) Appl. No.: 17/313,448

(22) Filed: May 6, 2021

(65) Prior Publication Data
US 2022/0021123 A1    Jan. 20, 2022

Related U.S. Application Data

(60) Provisional application No. 63/053,058, filed on Jul. 17, 2020.

(51) Int. Cl.
*H01Q 15/00*    (2006.01)
*H01Q 17/00*    (2006.01)
(Continued)

(52) U.S. Cl.
CPC ..... *H01Q 15/0086* (2013.01); *H01Q 15/0013* (2013.01); *H01Q 15/12* (2013.01);
(Continued)

(58) Field of Classification Search
CPC .. H01Q 15/0086; H01Q 15/12; H01Q 17/007; H01Q 15/246; H01Q 17/008; H01Q 15/0013; G02B 1/002
See application file for complete search history.

(56) References Cited

U.S. PATENT DOCUMENTS 2,822,539 A    2/1958   Mcmillan
3,267,480 A    8/1966   Lerner
(Continued)

FOREIGN PATENT DOCUMENTS

CN    108539431 B  *  2/2020   ......... H01Q 15/0093

OTHER PUBLICATIONS

W. Yuan and Y. Cheng, "Low-frequency and broadband metamaterial absorber based on lumped elements: design, characterization and experiment," Appl. Phys. A Mater. Sci. Process., vol. 117, No. 4, pp. 1915-1921, Dec. 2014.
(Continued)

*Primary Examiner* — Ab Salam Alkassim, Jr.
*Assistant Examiner* — Yonchan J Kim
(74) *Attorney, Agent, or Firm* — Lerner David LLP

(57) ABSTRACT

An electromagnetic energy absorber comprising a thin electrically-conductive ground plane as a base. Dielectric layers are positioned over the ground plane and high impedance surface (HIS) as a top layer. The impedance layer can be formed by loading the lumped resistor to a metallic grating like an FSS (Frequency Selective Surface). An air-spacer between the substrates has replaced the problem of the large electrical thickness of the substrate with effective permittivity. Metamaterial structures enable control over the resonant frequencies, and performance is enhanced over a broad frequency band. In addition, two broadband reflective-type linear to orthogonal polarization converters are disclosed that provide improved bandwidth and angular stability performance.

12 Claims, 14 Drawing Sheets

(51) Int. Cl.
 H01Q 15/24 (2006.01)
 H01Q 15/12 (2006.01)
 G02B 1/00 (2006.01)
(52) U.S. Cl.
 CPC ......... *H01Q 15/246* (2013.01); *H01Q 17/007* (2013.01); *H01Q 17/008* (2013.01); *G02B 1/002* (2013.01)

(56) References Cited

U.S. PATENT DOCUMENTS

| | | |
|---|---|---|
| 3,721,982 A | 3/1973 | Wesch |
| 3,754,271 A | 8/1973 | Epis |
| 4,599,623 A | 7/1986 | Havkin et al. |
| 5,081,455 A | 1/1992 | Inui et al. |
| 5,214,432 A | 5/1993 | Kasevich et al. |
| 5,381,149 A | 1/1995 | Dougherty et al. |
| 6,906,685 B2 | 6/2005 | English et al. |
| 7,538,946 B2 | 5/2009 | Smith et al. |
| 7,583,439 B2 | 9/2009 | Tsai et al. |
| 8,271,241 B2 | 9/2012 | Akyurtlu et al. |
| 9,806,426 B2 | 10/2017 | Bryant et al. |
| 2003/0142036 A1* | 7/2003 | Wilhelm ............ H01Q 1/38 343/756 |
| 2014/0166103 A1 | 6/2014 | Kempa et al. |
| 2022/0077590 A1* | 3/2022 | Itami ............... H01Q 15/148 |

OTHER PUBLICATIONS

S. Ghosh, S. Bhattacharyya, D. Chaurasiya, and K. V. Srivastava, "A broadband polarization-insensitive circuit analog absorber using lumped resistors," 2015 IEEE Appl. Electromagn. Conf. AEMC 2015, vol. 2, pp. 4-5, Dec. 18, 2015.

N. Hakla, S. Ghosh, and K. V. Srivastava, "Design of low-profile broadband capacitive circuit absorber," Electron. Lett., vol. 52, No. 22, pp. 1825-1826, Oct. 2016.

M. Saikia and K. V. Srivastava, "Design of Thin Broadband Microwave Absorber using Combination of Capacitive and Circuit Analog Absorbers," 2018 IEEE Indian Conf. Antennas Propagation, InCAP 2018, pp. 1-4, Dec. 16, 2018.

K. Chen, X. Luo, G. Ding, J. Zhao, Y. Feng, and T. Jiang, "Broadband microwave metamaterial absorber with lumped resistor loading," EPJ Appl. Metamaterials, vol. 6, 1, Jan. 16, 2019.

S. Ghosh, S. Bhattacharyya, and K. V. Srivastava, "Design, characterisation and fabrication of a broadband polarisation-insensitive multilayer circuit analogue absorber," IET Microwaves, Antennas Propag., vol. 10, No. 8, pp. 850-855, May 2016.

J. Lan, X. Cao, J. Gao, L. Cong, S. Wang, and H. Yang, "Design of Miniaturized Wideband Microwave Absorber Loaded with Lumped Resistance," Radioengineering, vol. 27, No. 3, p. 747, Sep. 2018.

J. Chen et al., "Polarization-Independent, Thin, Broadband Metamaterial Absorber Using Double-Circle Rings Loaded with Lumped Resistances," J. Electron. Mater., vol. 44, No. 11, pp. 4269-4274, Nov. 2015.

S. Li, J. Gao, X. Cao, W. Li, Z. Zhang, and D. Zhang, "Wideband, thin, and polarization-insensitive perfect absorber based the double octagonal rings metamaterials and lumped resistances," J. Appl. Phys., vol. 116, No. 4, p. 43710, Jul. 28, 2014.

D. Kundu, A. Mohan, and A. Chakrabarty, "Single-layer wideband microwave absorber using array of crossed dipoles," IEEE Antennas Wirel. Propag. Lett., vol. 15, No. c, pp. 1589-1592, Jan. 2016.

Y. Shi, Y. C. Li, T. Hao, L. Li, and C.- H. Liang, "A design of ultra-broadband metamaterial absorber," Waves in Random and Complex Media, vol. 27, No. 2, pp. 381-391, Apr. 3, 2017.

H. Zhai, B. Zhang, K. Zhang, and C. Zhan, "A stub-loaded reconfigurable broadband metamaterial absorber with wide-angle and polarization stability," J. Electromagn. WavEs Appl., vol. 31, No. 4, pp. 447-459, Mar. 4, 2017.

T. T. Nguyen and S. Lim, "Design of Metamaterial Absorber using Eight-Resistive-Arm Cell for Simultaneous Broadband and Wide-Incidence-Angle Absorption," Sci. Rep., vol. 8, No. 1, pp. 1-10, Apr. 26, 2018.

F. Li et al., "Compact High-Efficiency Broadband Metamaterial Polarizing Reflector at Microwave Frequencies," IEEE Trans. Microw. Theory Tech., vol. 67, No. 2, pp. 606-614, Dec. 4, 2018.

B. Lin et al., "Ultra-wideband and high-efficiency reflective polarization converter for both linear and circular polarized waves," Appl. Phys. A Mater. Sci. Process., vol. 125, No. 2, pp. 1-8, Feb. 1, 2019.

X. Gao, X. Han, W. P. Cao, H. O. Li, H. F. Ma, and T. J. Cui, "Ultrawideband and High-Efficiency Linear Polarization Converter Based on Double V-Shaped Metasurface," IEEE Trans. Antennas Propag., vol. 63, No. 8, pp. 3522-3530, May 18, 2015.

M. Akbari, F. Samadi, A. R. Sebak, and T. A. Denidni, "Superbroadband Diffuse Wave Scattering Based on Coding Metasurfaces: Polarization Conversion Metasurfaces," IEEE Antennas Propag. Mag., vol. 61, No. 2, pp. 40-52, Feb. 22, 2019.

F. Samadi, M. Akbari, S. Zarbakhsh, R. Chaharmir, and A. Sebak, "High efficient linear polariser using FSS structure," IET Microwaves, Antennas Propag., vol. 13, No. 1, pp. 88-91, Jan. 13, 2019.

X. Huang, H. Yang, D. Zhang, and Y. Luo, "Ultrathin Dual-Band Metasurface Polarization Converter," IEEE Trans. Antennas Propag., vol. 67, No. 7, pp. 4636-4641, Jul. 2019.

* cited by examiner

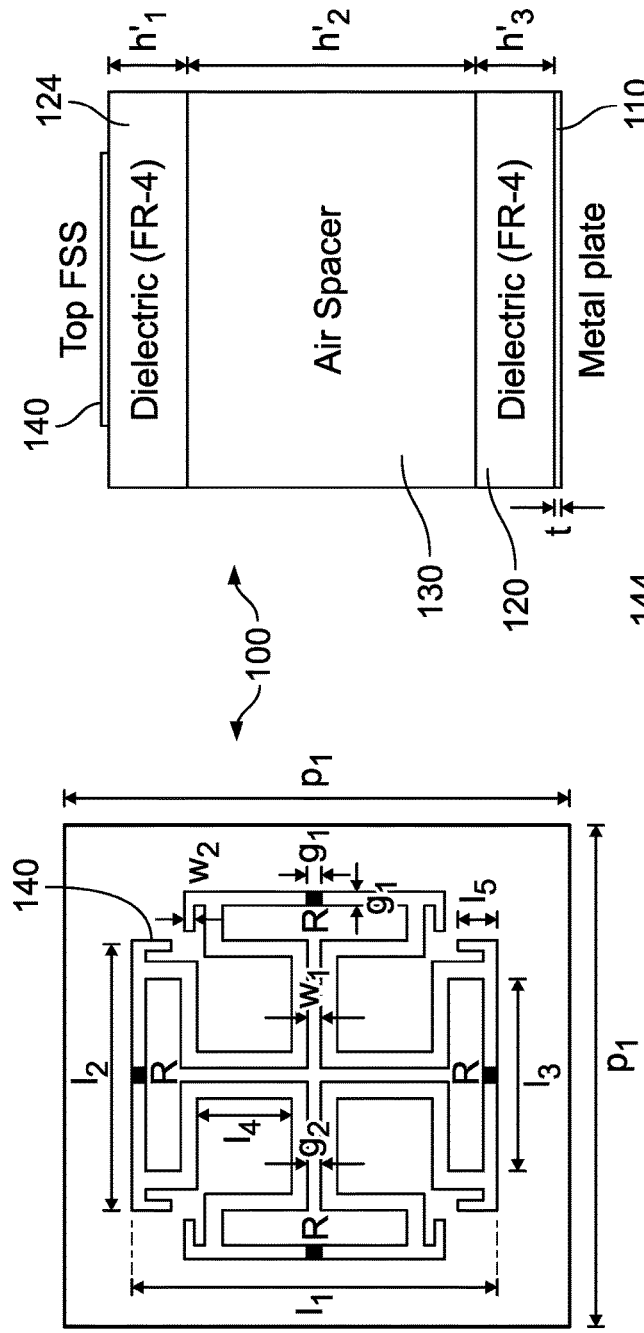
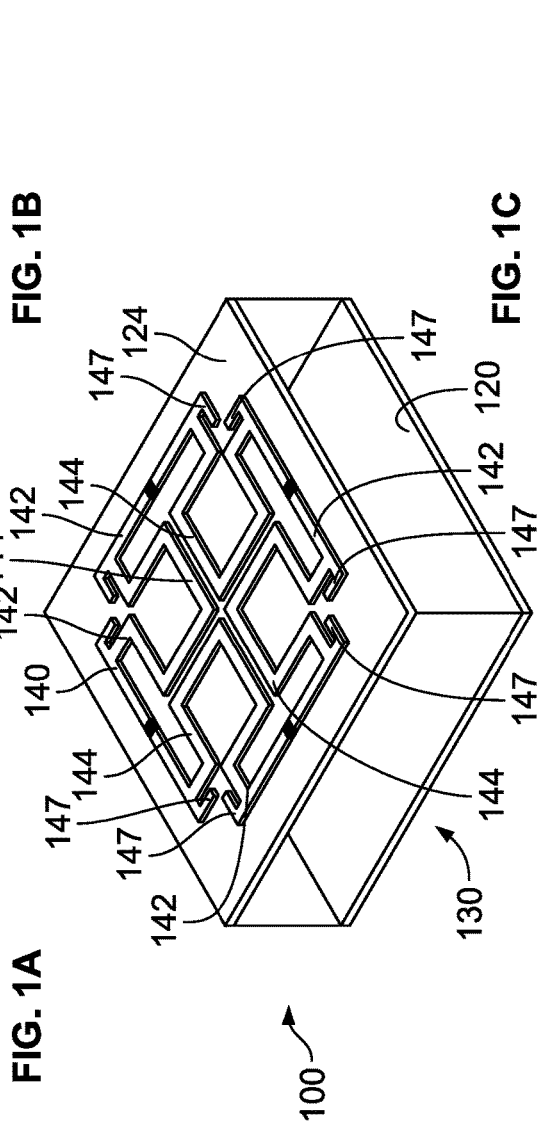
FIG. 1A
FIG. 1B
FIG. 1C

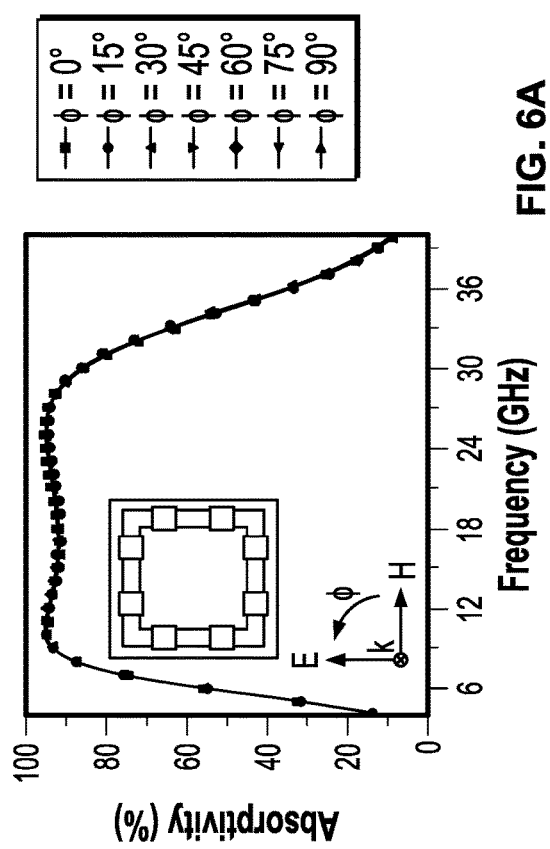
FIG. 6A
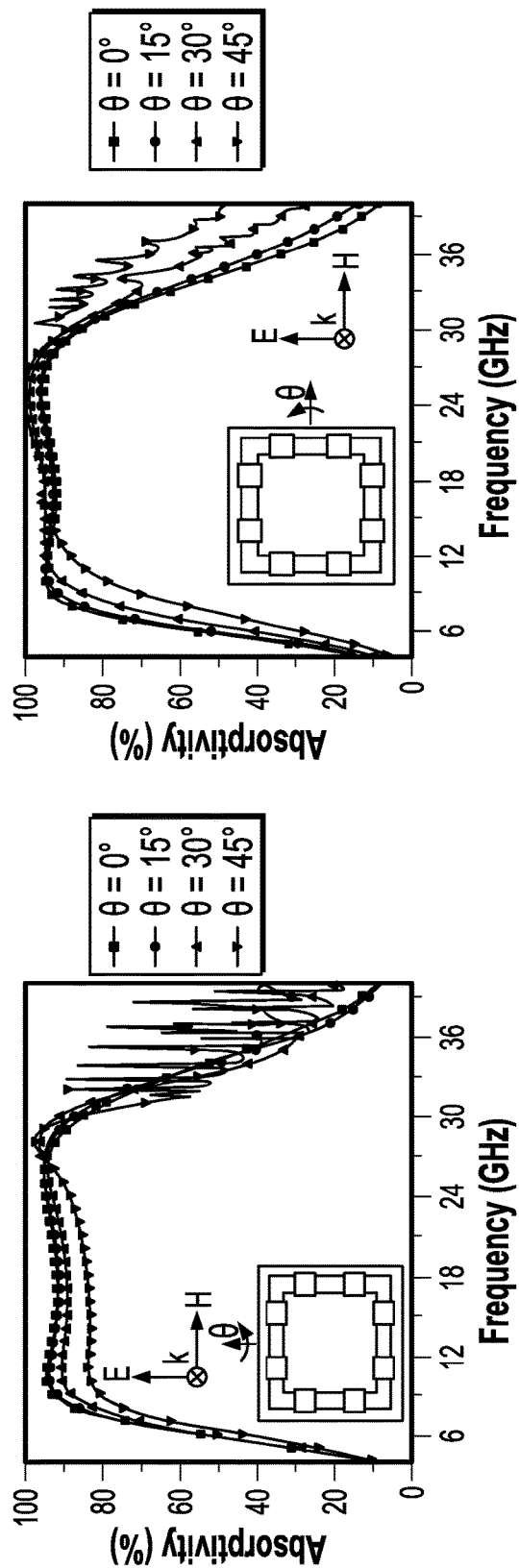
FIG. 6B
FIG. 6C

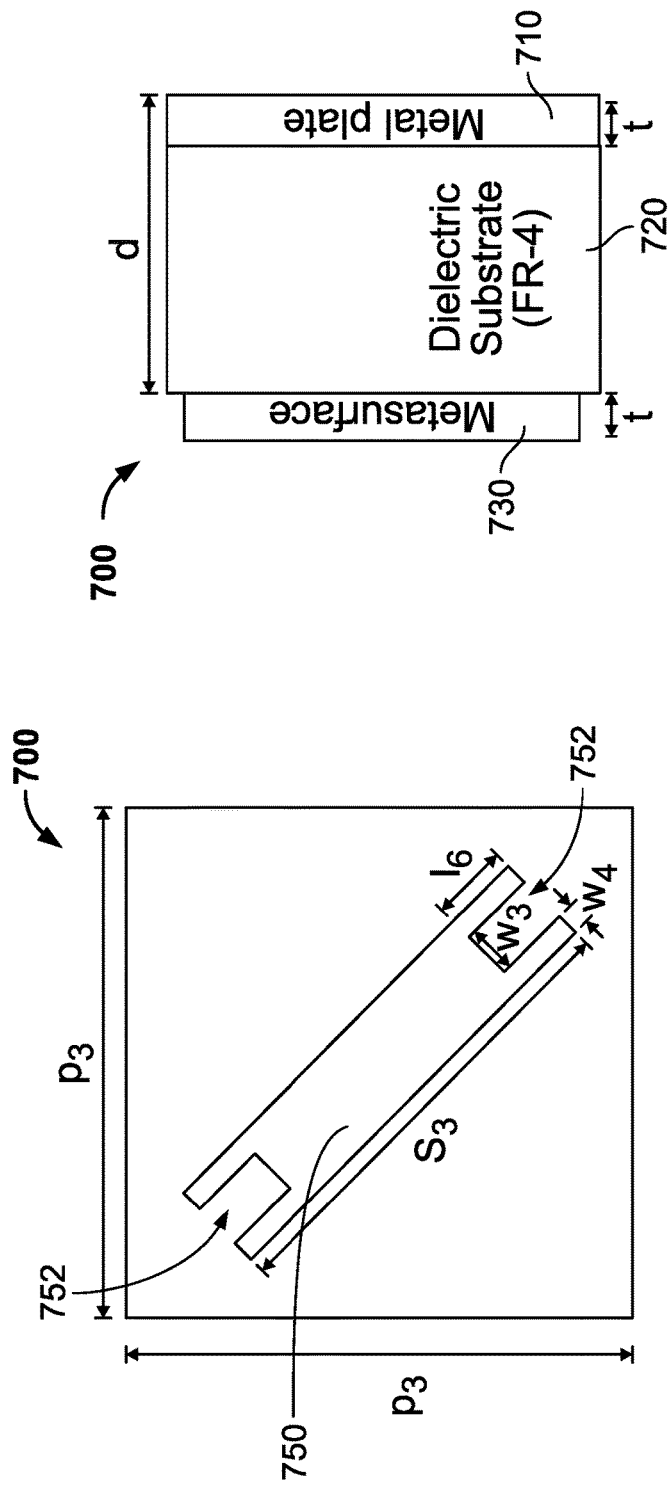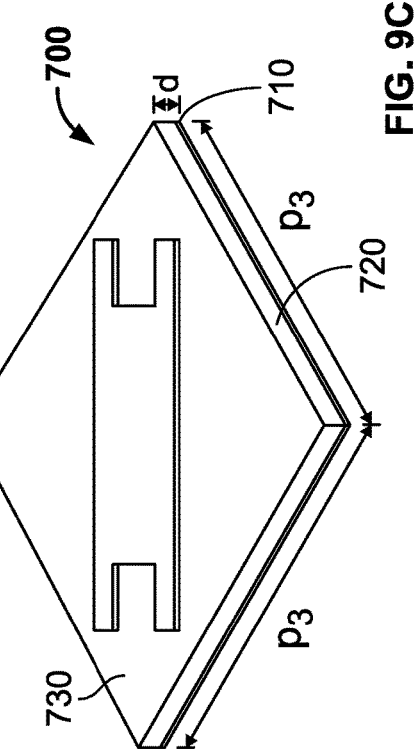
FIG. 9A
FIG. 9B
FIG. 9C

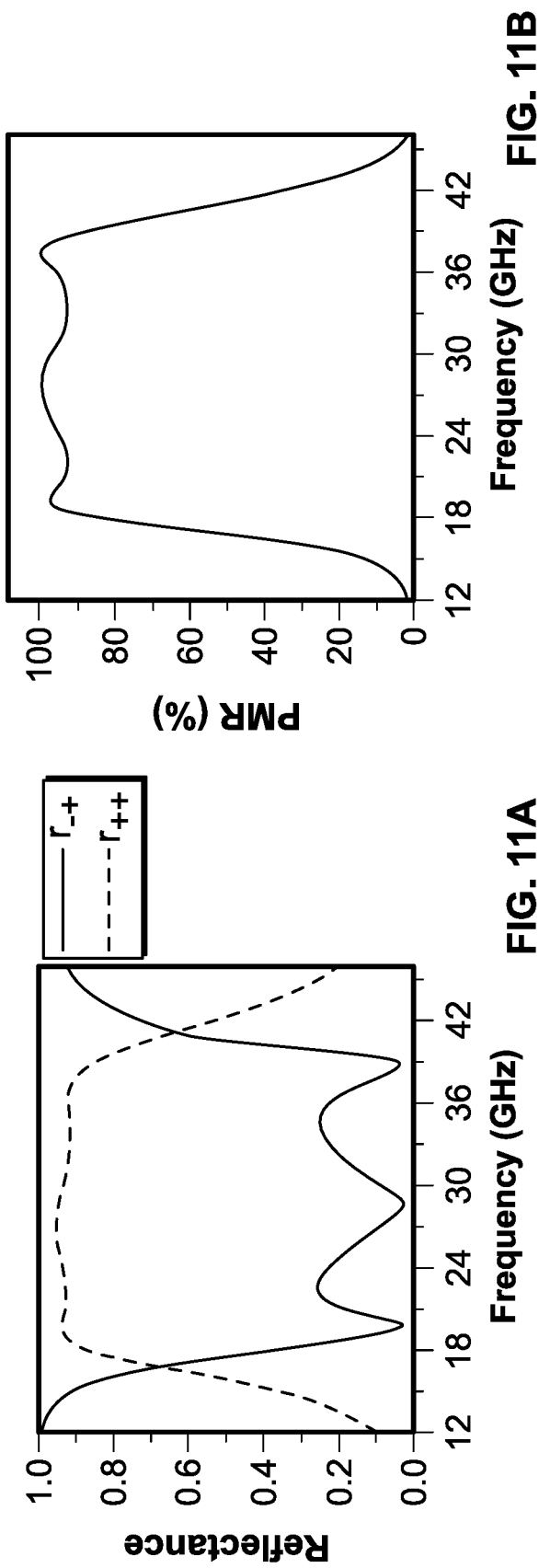

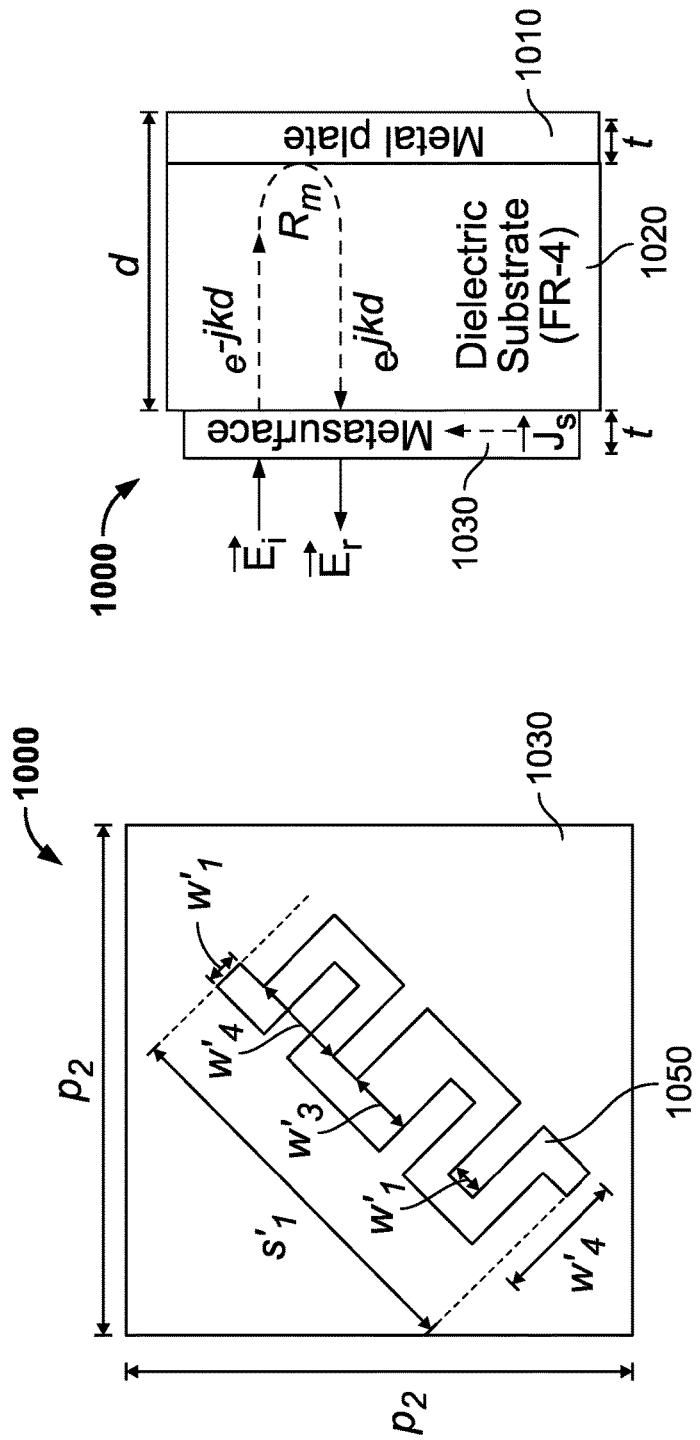
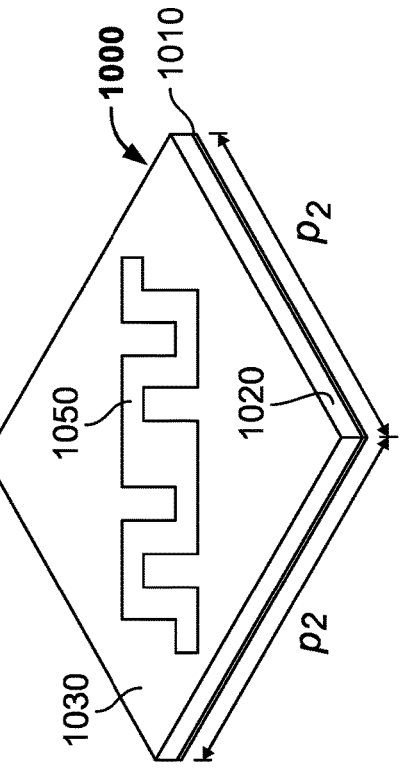
FIG. 12A
FIG. 12B
FIG. 12C

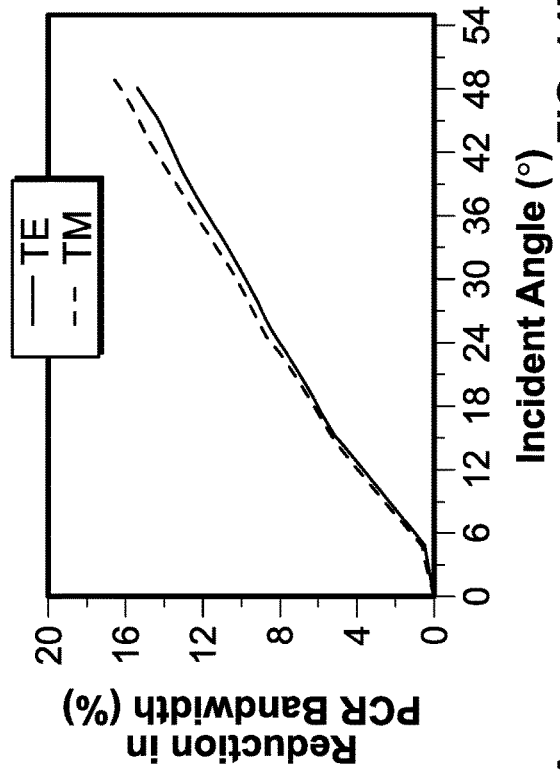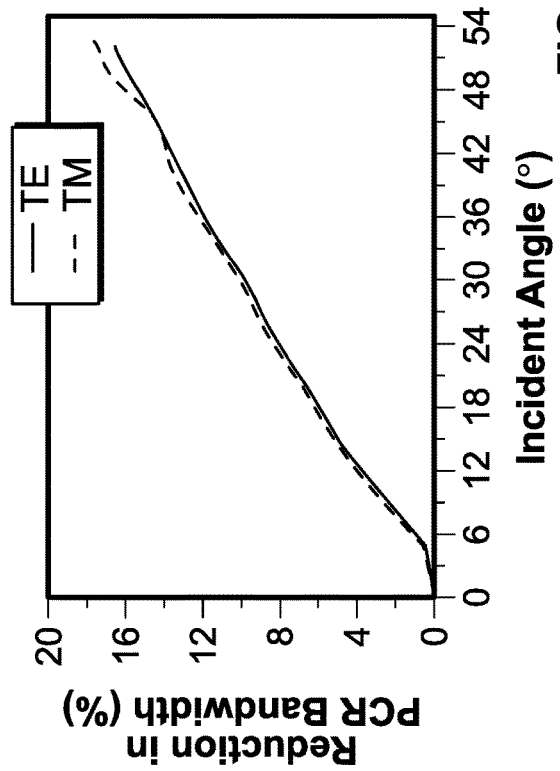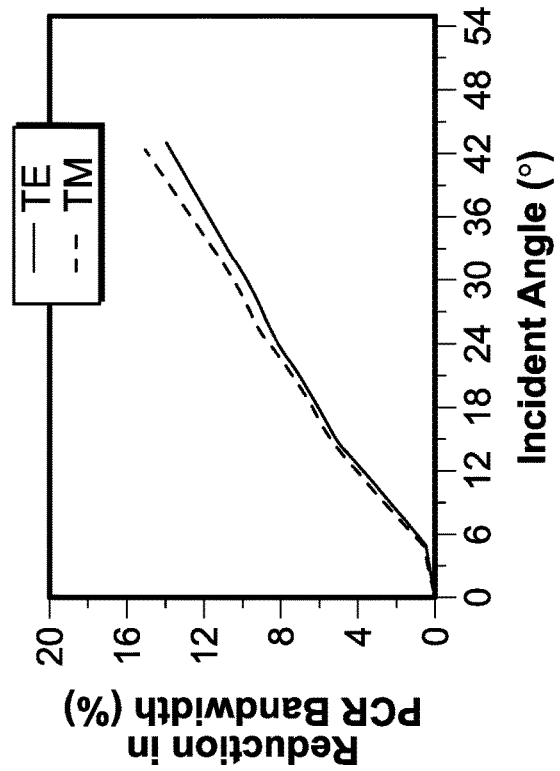
FIG. 14A  FIG. 14B  FIG. 14C  FIG. 14D

BROADBAND METAMATERIAL ENABLED ELECTROMAGNETIC ABSORBERS AND POLARIZATION CONVERTERS

CROSS-REFERENCES

The present application claims the benefit of U.S. Application No. 63/053,058, filed Jul. 17, 2020, the disclosure of which is incorporated herein by reference.

BACKGROUND

The technology of this application relates to broadband electromagnetic energy absorbers and broadband reflecting type linear to cross-polarization converters. More particularly, this disclosure relates to lumped resistor loaded circuit analog absorbers with dual-substrates separated by an air-spacer and a single-layered anisotropic metasurface based reflective-type linear to the cross-polarization converter. These devices may be fabricated with PCB (printed circuit board) and SMD (surface mount device) technology.

Metamaterials generally encompass a broad class of materials created and/or engineered to have properties not found in naturally occurring materials. Metamaterial properties are usually derived from their structures and not from properties typically associated with their base materials. Various characteristics of these materials, e.g., shape, geometry, orientation, and/or arrangement, create properties that can manipulate electromagnetic waves, such as blocking, absorbing, or converting waves.

Various types of broadband electromagnetic absorbers have been used in the microwave regime, such as for Radar Cross Section-reduction ("RCS-reduction") in stealth technology and antenna applications, Electromagnetic Interference ("EMI") suppression, Mutual Coupling Reduction ("MCR") between broadband antennas, thermo-voltaic applications (e.g., RF energy harvesting), and remote sensing. Compared to a Jaumann screen type absorber, horizontal stacking of different unit cells on a single layer, vertical stacking on multiple layers, material composition coatings like carbon nanotubes, and magnetic substrate-based absorbers, the circuit analogue absorber (CAA) provides better absorption with a low-profile planar nature, is less bulky in volume, and is typically lightweight.

SUMMARY

Aspects of the disclosed technology include improvements in electromagnetic absorbers and polarization converter circuits.

For example, an aspect of the disclosed technology is a broadband electromagnetic absorber, comprising an electrically conductive ground plane, a first dielectric substrate arranged above the electrically conductive ground plane in a stacking direction, a second dielectric substrate arranged above the first substrate in the stacking direction, and an air gap between the first dielectric substrate and the second dielectric substrate that separates the first dielectric substrate from the second dielectric substrate. The broadband electromagnetic absorber may further comprise a first frequency selective surface (FSS) comprising a plurality of lumped resistors, the first FSS being arranged on the second dielectric substrate.

In accordance with this aspect of the disclosed technology, the broadband electromagnetic absorber may comprise a second frequency selective surface (FSS) arranged on the first dielectric substrate between the first dielectric substrate and the second dielectric substrate. In the broadband electromagnetic absorber, the air gap may be arranged between the second FSS and the first dielectric substrate. In some examples, the second FSS may comprise an inductive grid. In other examples, the first FSS may be arranged along a periphery of the second dielectric substrate and comprise a quadrilateral shape. In this regard, the plurality of lumped resistors may be arranged along the periphery of the second dielectric substrate on the first FSS.

In accordance with this aspect of the disclosed technology, the air gap may be created with one or more nylon screws or one or more foam structures. In some examples, the air gap is created by an air spacer. The air spacer may comprise one or more nylon screws or one or more foam structures.

In accordance with this aspect of the disclosed technology, the first FSS comprises a cross-loop surface having a plurality of inner loops and a plurality of outer loops. In some examples, the plurality of lumped resistors is arranged on the plurality of outer loops. In other examples, the outer loops correspond to a first resonance frequency and the inner loop corresponding to a second resonance frequency. In other examples, the first resonance frequency is higher than the second resonance frequency.

In accordance with this aspect of the disclosed technology, each substrate is separated from the ground plane so as to cause the ground plane to absorb electromagnetic energy over a range of frequencies. In some examples, the range of frequencies comprises 2 GHz to 6 GHz.

Another aspect of the disclosed technology may comprise a broadband electromagnetic absorber, comprising an electrically conductive ground plane; a first frequency selective surface (FSS) arranged above the electrically conductive ground plane and spaced from the electrically conductive ground plane by an air gap; and a second frequency selective surface (FSS) comprising a plurality of lumped resistors, the second FSS being of a ring shape and arranged so as to be separated from the first FSS by a substrate.

In accordance with this aspect of the disclosed technology, the plurality of lumped resistors may be arranged on the second FSS such that any two neighbouring resistors are equally spaced apart along a circumference of the ring shape.

In accordance with this aspect of the disclosed technology, the first FSS comprises another plurality of lumped resistors and is ring-shaped. In some examples, another plurality of lumped resistors is arranged on the first FSS such that any two neighbouring resistors are equally spaced apart along a circumference of the first FSS. Further in this regard, each FSS is separated from the ground plane so as to cause the ground plane to absorb electromagnetic energy over a range of frequencies. In some examples, the range of frequencies may comprise 6 GHz to 25 GHz.

Another aspect of the disclosed technology comprises an electromagnetic polarization converter. The electromagnetic polarization converter comprises a ground plane; a dielectric substrate disposed on the ground plane; a metasurface (frequency selective surface) disposed on the dielectric substrate; the frequency selective surface formed as one of an H-shaped structure or a meander line structure.

In accordance with this aspect of the disclosed technology, the frequency selective surface is separated from the ground plane by $\lambda_g/4$, where $\lambda_g$ is a guided wavelength corresponding to a center frequency of a frequency band over which polarization conversion takes place.

In accordance with this aspect of the disclosed technology, the metasurface comprises a planar structure having four sides and four vertices and the frequency selective surface is oriented at a 45° angle along a diagonal line intersecting two of the four vertices.

In accordance with this aspect of the disclosed technology, the frequency selective surface comprises the H-shaped structure, the H-shaped structure having a lengthwise edge and a widthwise edge, the widthwise edge having a notch having a width $w_3$ and portion extending a distance of $w_4$, wherein $w_3$ is ⅗ of $w_4$.

In accordance with this aspect of the disclosed technology, the frequency selective surface comprises the meander line structure, the meander line structure comprising a channel formed on the metasurface and having a plurality of asymmetric widths. In some examples, a first width $w_3$ of the plurality of asymmetric widths is twice a second width $w_2$ of the plurality of asymmetric widths.

BRIEF DESCRIPTION OF DRAWINGS

FIGS. 1A-1C are schematic diagrams illustratively depicting examples of an inductive loaded cross-loop absorber in accordance with an aspect of the disclosure.

FIGS. 6A-6C illustratively depict simulated normal and oblique incidence angular stability of one or more dual-cut square loop absorbers in accordance with an aspect of the disclosure.

FIGS. 9A-9C are schematic diagrams illustratively depicting examples of an H-shaped polarization converter in accordance with an aspect of the disclosure.

FIGS. 11A-11B illustratively depict simulated S-parameters explaining the circular polarization handiness of one or more H-shaped polarization converters in accordance with an aspect of the disclosure.

FIGS. 12A-12C are schematic diagrams illustratively depicting examples of a meander line shaped polarization converter in accordance with an aspect of the disclosure.

FIGS. 14A-14D illustratively depict simulated bandwidth reduction curves at different PCR ranges of a meander line shaped polarization converter in accordance with an aspect of the disclosure.

DETAILED DESCRIPTION

Figure 2A:
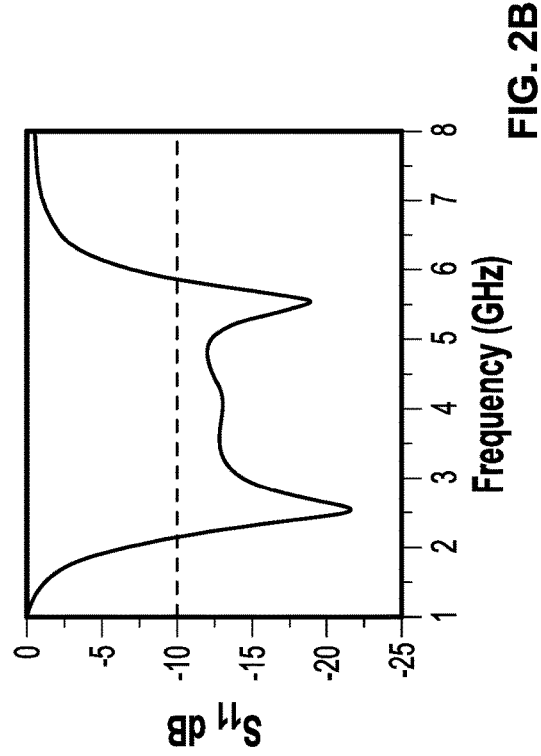
FIGS. 2A-2D illustratively depict simulated S-parameters of one or more inductive loaded cross-loop absorbers in accordance with an aspect of the disclosure.
Figure 2B:
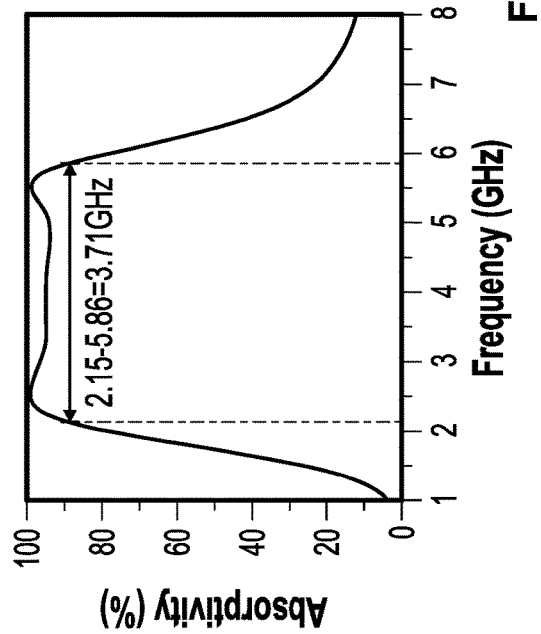

Aspects of the disclosed technology include broadband absorbers for applications covering the microwave spectrum such as, for example, RCS-reduction, EMI suppression, MCR between broadband antennas, thermo-voltaic applications (e.g., RF energy harvesting), and remote sensing. Moreover, CAAs having design versatility and absorption performance improvements without use of lossy materials as spacers are disclosed. Resistive frequency selective surfaces (FSS) or resistive periodic pattern surfaces (PPS) provide reactance components as well as resistance. Due to the presence of both components, CAA resonance does not necessarily depend solely on spacer resonance as in conventional absorbers.

Additionally, harvesting RF energy over a broad frequency band, for example at sub-6 GHz frequencies, is another potential application. Chip resistors may be used to deliver the absorbed (RF thermal) power to the active component of the harvesting circuitry. This may lead to a more efficient and compact broadband absorber with better angular stability at higher oblique incidence.

An aspect of the disclosed technology may comprise an electromagnetic absorber comprising a thin metallic film as a structural base, which may be considered a ground plane, a bottom substrate, and an upper substrate. Copper or any suitable material may be used as a ground plane. The absorber may further comprise a fiber-reinforced glass epoxy for use as a dielectric substrate. Preferably, the absorber comprises two substrates, e.g., the upper substrate and the bottom substrate, separated by an air-spacer. The air-spacer is operable to vary the effective permittivity as well as the overall thickness of the design. Nylon spacers may be used for stacking of the substrate. On the surface of the upper substrate, a cross-loop type frequency selective surface (FSS) is etched with one gap at each sidearm using conventional PCB techniques. Four lumped resistors are housed per each unit cell with SMD technology. Here, the top layer may act as a high impedance surface in a manner similar to a circuit analogue absorber (CAA). A secondary FSS may be avoided in this embodiment. The bottom substrate allows for cost-effectiveness in the design and improves performance.

Another aspect of the disclosed technology may be an electromagnetic energy absorber comprising a structural base having an electrically conductive component, which may be considered a ground plane or a surface, and two dielectric substrates. Fiber-reinforced glass epoxy may be used as a dielectric substrate. An air-spacer separates the dielectric substrates, and it is possible to provide the air-gap using nylon screws. The first impedance layer on the top substrate is a periodic arrangement of the dual-cut square loop with eight lumped resistors soldered per each square loop via a SMD technology. On each side of the square loop, resistors are spaced to enhance the performance. The impedance of an FSS on the top substrate is generally a complex value (non-zero reactance). A cross-type inductive grid is printed on the bottom substrate. The impedance layers on both substrates may be fabricated using PCB technology. In the PCB technique, an unwanted metal portion may be etched out to create the periodic or semi-random arrangement of unit cells.

Another aspect of the disclosed technology is controlling and manipulating the polarization of electromagnetic waves in practical applications such as polarization beam splitters, quarter-wave and half wave-plates, in antenna design, and RCS reduction in stealth technology. The birefringence effect is responsible for the polarization conversion in the optical regime. Due to naturally occurring weak anisotropy in available crystals, these structures are bulky, and require larger thickness compared to the operating wavelength. Thus, it is difficult to integrate this device in a sub-miniaturized system at the microwave and millimeter wave regimes. Following the advent of FSS technology, polarization conversion may be achieved by the extrinsic chirality in the wave propagation direction or discrepant amplitude and phase modulation of the orthogonal electric field component in the near field coupling of an EM wave. In comparison with conventional converters, metamaterials enable polarization converters to offer low-profile (sub-wavelength size), lightweight, and easy migration with the compact systems.

Linear-to-cross-converters are used in antenna design where polarization diversity is desired, and in heavier complex-feed antenna systems to change the polarization of an EM wave without any physical rotation or modification of the original system. Thus, it is important to develop an efficient broadband polarization converter with size compactness without compromising the performance at higher oblique angle incidence.

In that regard, a broadband reflective-type linear-to-cross-polarization converter covering the entire K and Ka-bands is disclosed. The reflective-type converter offers broader bandwidth, and thus is useful for the foregoing applications. A technical feature is that surface plasmon polaritons are responsible for the broadband conversion.

Another aspect of the disclosed technology may comprise a reflective-type linear- to cross-electromagnetic polarization converter. The converter may comprise an H-shaped metasurface, a dielectric substrate, and a metal plane. The metasurface may be etched on a surface of the converter. The metasurface may be etched using PCB techniques. Layers of the metasurface may also be created by removing or eliminating parts of a film in a way that leaves geometrical parts of the film as a broken pattern. Fiber-reinforced glass-epoxy composites may comprise a dielectric. The thickness of the substrate is chosen as λ/4, where λ is the wavelength corresponding to the centre frequency of the broadband signal. The converter may comprise a thin metallic film as the ground plane. Artificial anisotropy is created by rotating the unit cell at 45°. Mostly copper or any suitable material can be used as a ground plane for the support of the design.

Another aspect of the disclosed technology may comprise a broadband reflective-type linear- or cross-polarization converter comprising a ground plane, a dielectric substrate, and a metasurface. An electrically conductive sheet comprising the ground plane may be used as the base for this design. A fiber-reinforced glass epoxy resin could be used as the dielectric substrate 2A. By using PCB technology, a meander line structure with non-uniform width is etched on the top of the substrate. The widths and gaps of the meander line are chosen such that the size of the unit cell may be reduced. This meander line FSS is rotated at 45° and preferably satisfies the artificial chirality property.

FIGS. 1A-1C depict schematics of an absorber 100 in accordance with an aspect of the disclosed technology. The absorber comprises a base 110 and a plurality of substrates 120 and 124. The substrates 120 and 124 are separated by an air-spacer 130. A cross-loop type Frequency Selective Surface (FSS) 140 is etched onto substrate 124. The FSS 140 comprises four lumped resistors R disposed along portions of the outer periphery of substrate 124. The base 110 functions as a ground plane and may comprise a metal plate. The metal plate may comprise a copper coated plate having a thickness of 35 microns with a conductivity $\sigma=5.8 \times 10^7$ S/m.

The substrates 120 and 124 may comprise a dielectric substrate and, more specifically, may comprise FR-4 PCB materials. The height or thickness ($h'_3$, $h'_1$) of substrates 120, 124, in a stacking direction as shown in FIG. 1B. In some examples, the thickness $h'_3$ of the bottom or first substrate 120 may be one-half, or approximately one-half, that of the thickness $h'_1$ of the top or second substrate 124. The height ($h'_2$) of air spacer or air gap 130 is typically larger than $h'_1$ or $h'_3$, and is typically larger than $h'_1$ and $h'_3$ combined. In some examples, $h'_1$ may be approximately equal to $2h'_3$, $h'_2$ may be approximately equal to 4.2 ($h'_1+h'_3$), and $h'_3$ is typically equal to approximately 0.8 mm.

The air spacer or gap 130 may be created using one or more nylon screws or one or more foam structures, and possibly a combination thereof. The air gap can be created in many ways. For example, five layers of double-sided adhesive tape may be used to create the air gap of height $h'_2$ and to avoid any kinds of mechanical drilling to the PCB. As is also shown in FIGS. 1B and 1C, each substrate is placed separately from the ground. This allows the absorber 100 to effectively absorb the electromagnetic energy over a broadband range of frequencies, e.g., 2 GHz to 6 GHz.

Figure 2C:
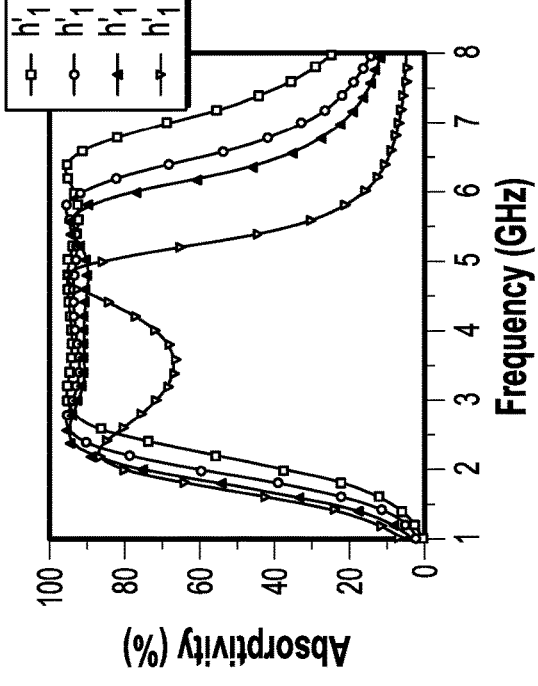

In addition to lumped resistors R, FSS 140 may comprise a cross-loop type FSS. As shown in FIGS. 1A and 1C, the FSS 140 includes outermost loops 142 and inner square loops 144. As shown, an outermost loop and an inner square loop may be considered as being formed by the same portions of the pattern that form FSS 140. The outermost loop corresponds to highest resonance, while the inner square loop (gap and width) controls the lower resonance. This allows the individual resonances to be independently tuned. In addition, inductive twigs 147 in FIG. 1C, or l5 in FIG. 1A, on the outermost loops may be configured to allow the highest resonance frequencies to be tunable. Based on surface current distributions, one skilled in the art should appreciate that the outer loop corresponds to the highest resonant peak. The dependence of absorptivity response on inductive twigs is depicted in FIG. 2C. The relation between l4 and l5 in some examples may be as follows: l5=(4/7) l4. $g_1$ indicates the dimensions of lumped resistors R, while $g_2$ and $w_1$ indicate the dimensions of the gap between inner square loops 144. $p_1$ indicates the length and width dimensions of substrate 124.

With reference to FIG. 1A, unit cell periodicity and absorptivity performance can be controlled via parameters $l_4$ and $l_1$. For example, in embodiments where $l_4=⅓$ times $l_1$, unit cell periodicity and absorptivity performance may be particularly advantageous. Further in this regard, in other examples, $l_2=⅔$ times $l_1$ unit cell periodicity and absorptivity performance may be particularly advantageous.

The absorber 100 is effective, as shown in FIGS. 2A-2D and 3A-3C, in absorbing electromagnetic energy over a wide frequency band in the gigahertz range with high absorptivity and attenuation from approximately 2 GHz to 6 GHz. For example, absorber 100 shows approximately 95% absorptivity over the frequency range from 2.15 GHz to 5.81 GHz covering all the sub 6 GHz frequencies including for example 2.14, 3.5, and 5.2 GHz. This performance may be achieved by choosing unit cell periodicity such that the grating lobes at higher oblique angles are beyond the vicinity of the operating band. In this regard, the dependency of the grating lobe on periodicity is given by the relation $$f = \frac{mc}{(1 \pm \sin\theta_i)p_1},$$

where f is the frequency at which the grating lobe starts to appear. The first grating lobe for this unit cell periodicity $p_1$ at 45° incident angle will be at 12.55 GHz (which is out of the absorption band). Hence, there is no effect of grating lobes in the operating range of frequencies. In this regard, note that the thickness of the first substrate is not as important a parameter in terms of controlling bandwidth, though its thickness may impact absorptivity performance due to the contribution of dielectric losses and cost-effectiveness of the design.

Figure 2D:
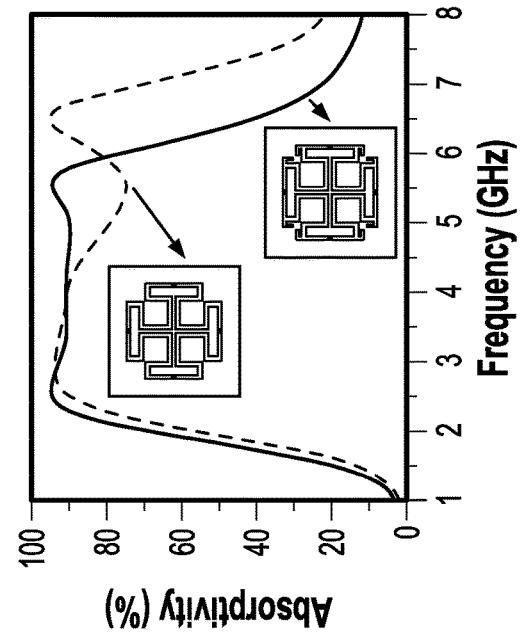
Figure 3A:
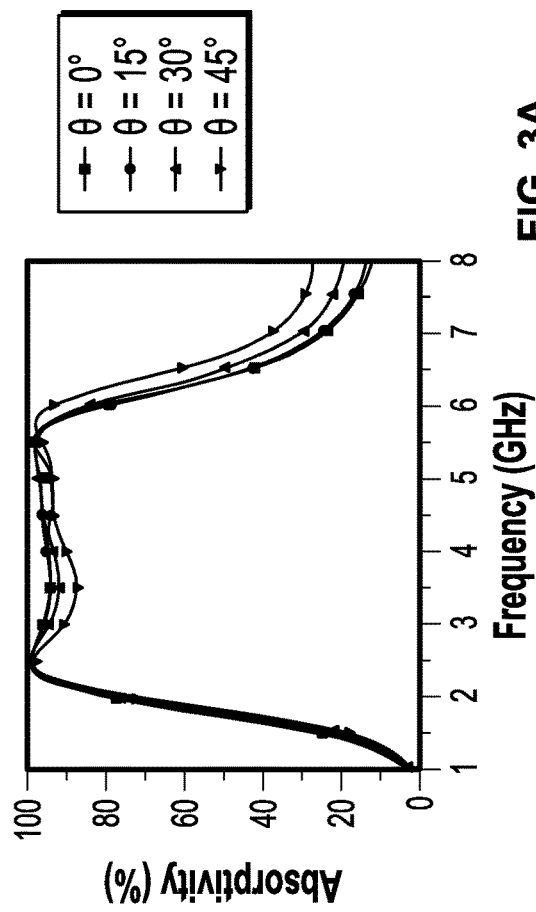
FIGS. 3A-3C illustratively depict simulated normal and oblique incidence angular stabilities of one or more inductive loaded cross-loop absorbers in accordance with an aspect of the disclosure.
Figure 3C:
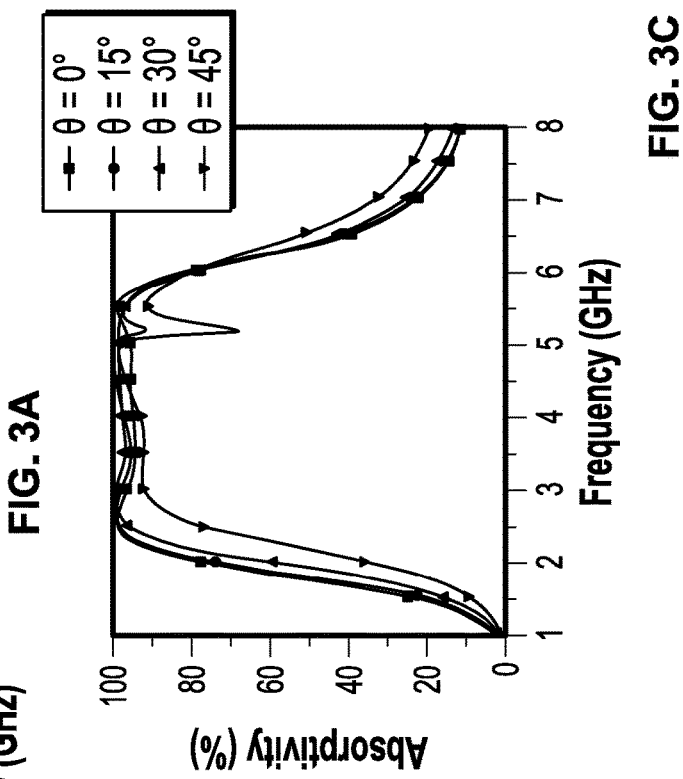
Figure 3B:
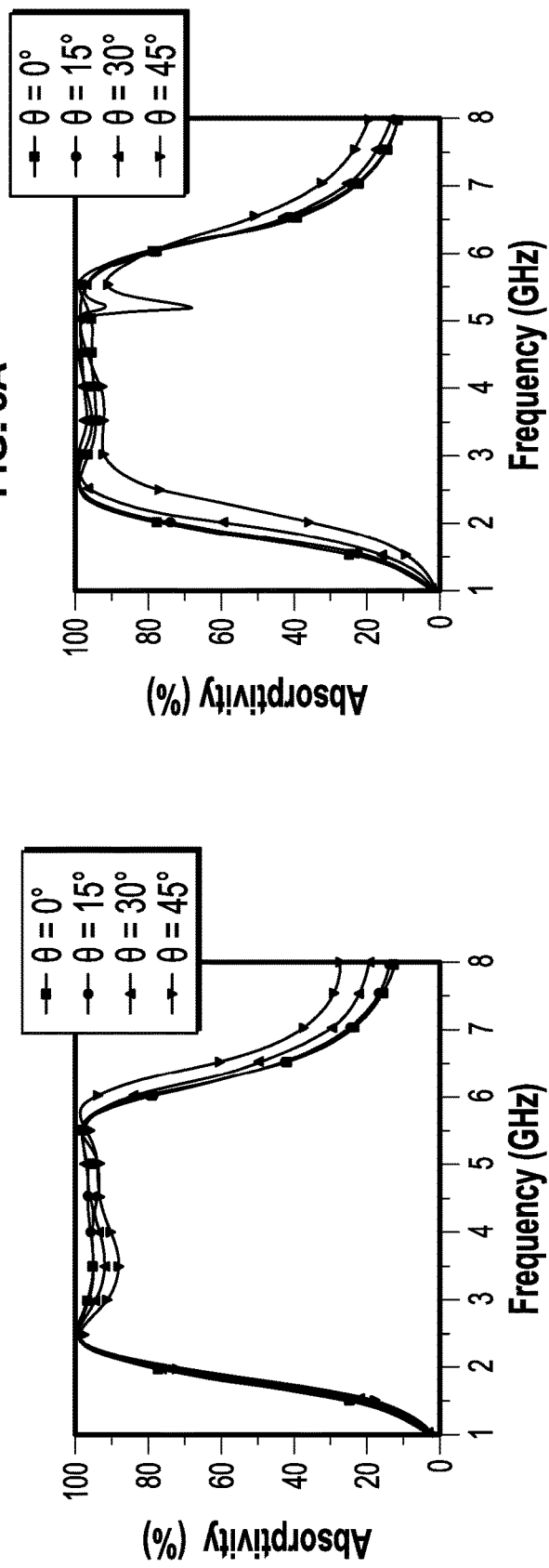

The absorber 100 shows 45° oblique stability for both TE and TM incidence with less bandwidth reduction in comparison with normal incidence. Further, as shown in FIG. 2D, the thickness of the second substrate is a parameter that adjusts the flat response over the band without compromising the bandwidth. In addition, at higher incidences in a TM case, the absorber experiences an anti-resonance in the higher frequency region as shown in FIG. 3C.

As depicted in Table 1 below, the unit cell of an absorber in accordance with one or more of the foregoing aspects of absorber 100 comprises a unit cell that is compact with a unit cell periodicity of $0.1\lambda_L$, and thickness of $0.08\lambda_L$ as depicted in Table 1 below, where $\lambda_L$ is the wavelength corresponding to the lowest frequency of the absorption band.

TABLE 1

| Year | Centre Frequency (GHz) | Bandwidth | FNBW (%) | Periodicity (in $\lambda_L$) | Thickness (in $\lambda_L$) | Oblique Stability (°) | No. of Lumped Resistors |
|---|---|---|---|---|---|---|---|
| 2014 | 4.08 | 2.46 | 60.2 | 0.285 | 0.04 | Not reported | 8 |
| 2015 | 6.06 | 4.2 | 69.3 | 0.264 | 0.08 | 45° | 4 |
| 2016 | 3.83 | 3.84 | 100 | 0.210 | 0.07 | 30° | 8 |
| 2018 | 6.18 | 3.9 | 63.1 | 0.197 | 0.06 | 30° | 4 |
| This work: 2020 | 4 | 3.73 | 92.6 | 0.100 | 0.08 | 45° | 4 |

Table 1 shows the performance of an absorber designed in accordance with aspects of the disclosed technology discussed in relation to absorber 100 (row "This work:2020") relative to the performance of other absorbers from 2014, 2015, 2016, and 2018. As is also shown in Table 1 and FIG. 2, absorptivity may be almost 95% over the frequency range without compromising the fractional bandwidth of nearly 92.6%.

FIGS. 4A-4D depict schematics of an absorber 400 in accordance with an aspect of the disclosed technology. FIGS. 5A-5D and 6A-6C show performance metrics of the absorber 400, as well as potential alternative structures.

Figure 4A:
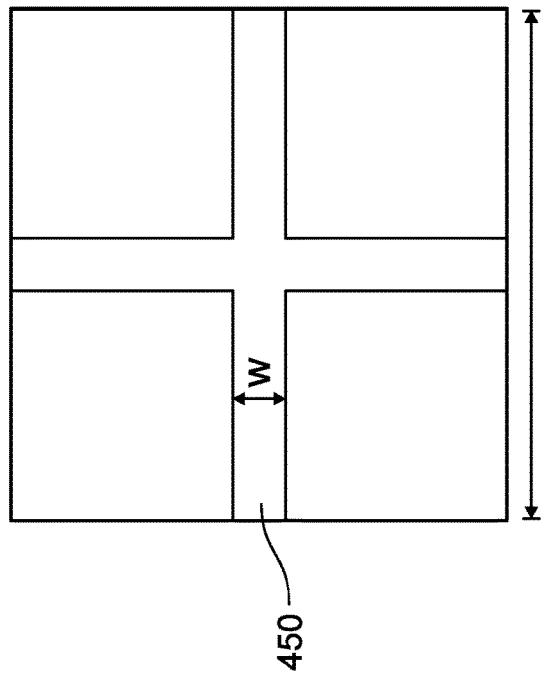
FIGS. 4A-4D are schematic diagrams illustratively depicting examples of a dual-cut square loop absorber in accordance with an aspect of the disclosure.

The absorber 400 comprises a ground plane 408, a first or bottom substrate 418, and a second or top substrate 428. Ground plane 408 may comprise a metal plate. The metal plate may comprise a copper coated plate having a thickness of 35 microns with a conductivity $\sigma=5.8\times10^7$ S/m. An air-spacer 437 is disposed between the first and second substrates, 418 and 428. An inductive grid 450 is formed on the first substrate 418. Inductive grid 450 acts as an FSS. A second or top FSS 460 is formed on the second substrate 428. Second FSS 460 includes eight lumped resistors R arranged along a periphery of second substrate 428. The spacing between the lumped resistors is optimized such that $s_1=s/3$ as depicted in FIG. 4A. First or bottom substrate 418 does not include any chip (lumped) resistors to enhance bandwidth.

Figure 4C:
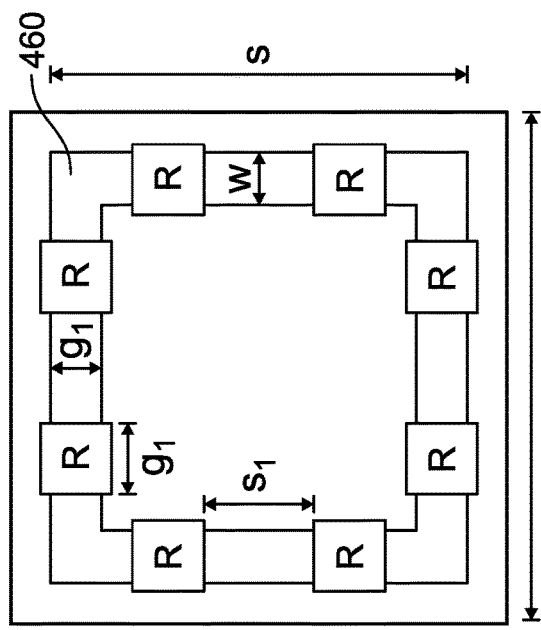
Figure 4B:
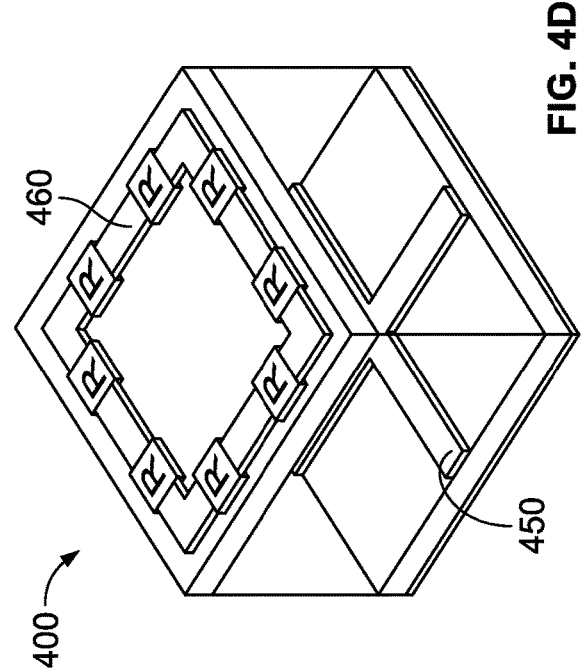
Figure 4D:
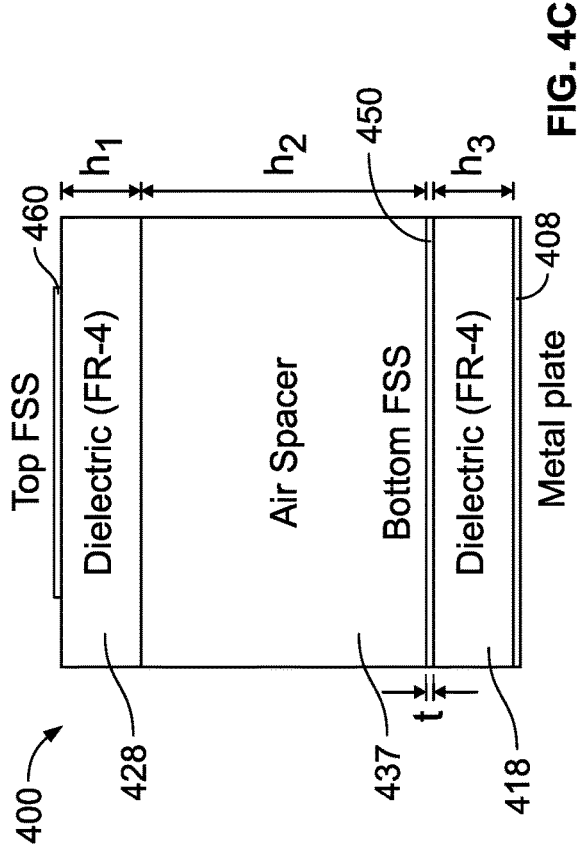

The substrates 418 and 428 may comprise a dielectric substrate and, more specifically, may comprise FR-4 PCB materials. As depicted in FIG. 4C, the height or thickness ($h_3$, $h_1$) of substrates 418, 428, in a stacking direction may be substantially equal. The height ($h_2$) of air spacer or air gap 437 is typically larger than $h_1$ or $h_3$, and is typically larger than $h_1$ and $h_3$ combined. For example, the height of the air-spacer may be equal to twice the sum of the individual thicknesses of the substrates, $h_2=2(h_1+h_3)$ as depicted in FIG. 4C. In some examples, $h_1=h_2=0.5$ mm, and $h_3=2$ mm. The air spacer 437 may be created using one or more nylon screws or foam, and possibly a combination thereof. As is also shown in FIGS. 4C and 4D, each substrate is placed separately from the ground. This allows the absorber 400 to effectively absorb the electromagnetic energy over a broadband range of frequencies, e.g., 8 GHz to 29 GHz.

Figure 5A:
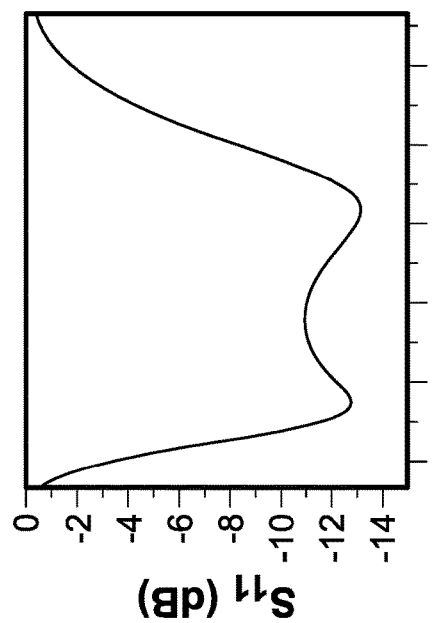
FIGS. 5A-5D illustratively depict simulated S-parameters of one or more dual-cut square loop absorbers in accordance with an aspect of the disclosure.
Figure 5B:
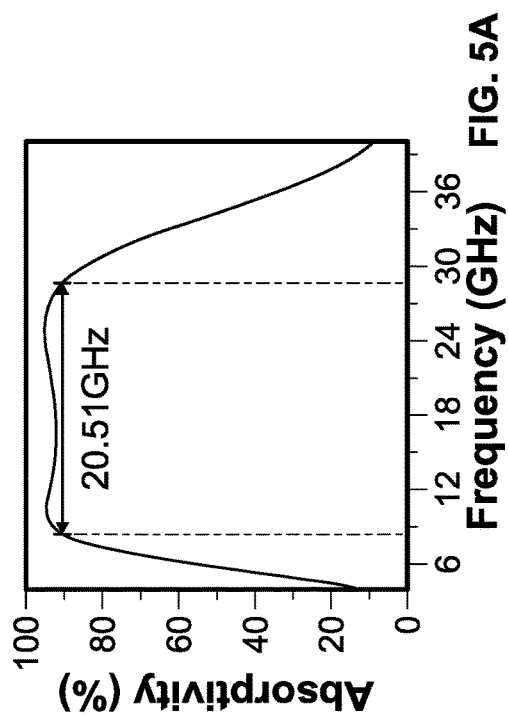
Figure 5C:
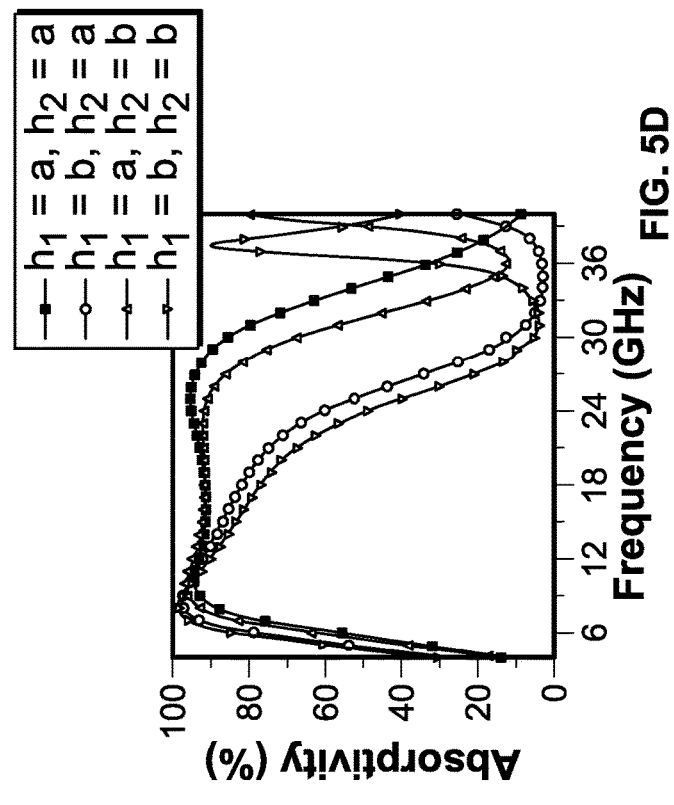
Figure 5D:
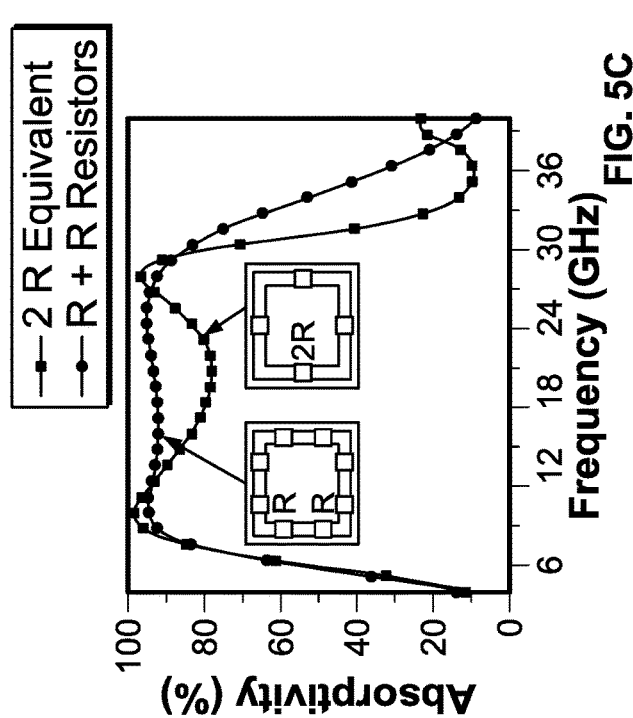

Substrates 418, 428 may be designed to be of equal thickness. This may result in flat absorption over the bandwidth as depicted in FIG. 5D. In addition, absorber 400 may be of a compact design. In particular, a unit cell may comprise periodicities $0.15\lambda_L$ and $0.0834\lambda_L$, where $\lambda_L$ is the wavelength corresponding to the lowest frequency of the absorption band. In addition, the unit cell periodicity is typically chosen such that the grating lobes at higher oblique angles are outside of the vicinity of the operating band as depicted in FIG. 6B and FIG. 6C.

Second or top FSS 460 comprises a geometric shape of a dual-cut square loop FSS and may include eight lumped resistors R. Because second FSS 460 comprises eight equal resistors R instead of four resistance equivalents of 2R, impedance of the second FSS is spread uniformly, which leads to improvement in the absorptivity response as depicted in FIG. 5C. The inductive grid 450 and second or top FSS are selected to have the same width (w). This may provide bandwidth enhancement by 1.1 GHz at a higher frequency region.

Absorbers designed in accordance with absorber 400 may show 45° oblique stability for both TE and TM incidences with less bandwidth reduction in comparison with normal incidences. Absorber 400 as discussed above, may provide a minimum of 92.5% absorptivity over the frequency range from 8.34 GHz to 28.85 GHz, covering the entire X, Ku, and Ka-bands with 20.51 GHz (110% FNBW) performance as depicted in Table 2.

TABLE 2

| Year | Substrate Used | Periodicity (in $\lambda_L$) | Oblique stability (°) | Centre Frequency (GHz) | Bandwidth (GHz) | FNBW (%) | Topology Used | No. of Resistors Used Per Unit Cell |
|---|---|---|---|---|---|---|---|---|
| 2019 | FR-4 | 0.1373 | 60° | 13.21 | 10.58 | 80.09 | Lumped Resistor + Vias | 4 |
| 2016 | FR-4 X2 with Air-spacer | 0.2149 | 45° for TE | 11.59 | 13.26 | 114.41 | Lumped Resistor | 12 |
| 2018 | FR-4 | 0.0902 | 45° | 5.95 | 7.30 | 122.69 | Lumped Resistor | 4 |
| 2015 | FR-4 | 0.4139 | 30° | 12.67 | 7.60 | 59.98 | Lumped Resistor | 8 |
| 2014 | FR-4 | 0.3172 | 20° | 12.55 | 9.25 | 73.68 | Lumped Resistor | 8 |
| 2016 | FR-4 | 0.2403 | 45° with 60% BW | 8.25 | 5.90 | 71.52 | Lumped Resistor | 4 |
| 2017 | FR-4 | 0.2400 | 30° | 11.10 | 10.20 | 91.89 | Lumped Resistor + Vias | 8 |
| 2017 | FR-4 | 0.2723 | 45° | 11.60 | 6 | 51.72 | Lumped Resistor + Lumped Inductor | 8 Resistors + 8 Inductors |
| 2018 | FR-4 | 0.4237 | 60° | 10.80 | 5.20 | 48.15 | Lumped Resistor | 8 |
| 2020 | FR-4 X2 with Air-spacer | 0.1556 | 45° for both TE and TM | 18.60 | 20.51 | 110 | Lumped Resistor | 8 |

Table 2 shows the performance of an absorber designed in accordance with aspects of the disclosed technology discussed in relation to absorber 400 (row "FR-4 X2 with air-spacer") relative to the performance of other absorbers from 2014 through 2019.

Figure 7B:
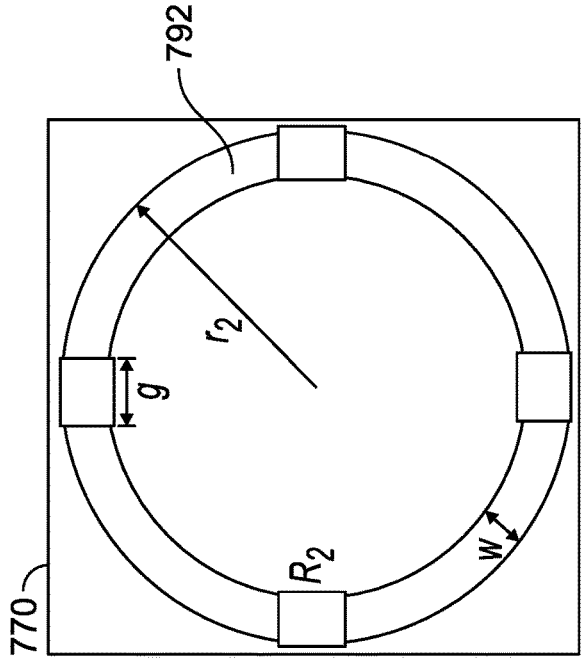
FIGS. 7A-7C are schematic diagrams illustratively depicting examples of a dual-circular circuit analog absorber in accordance with an aspect of the disclosure.
Figure 7A:
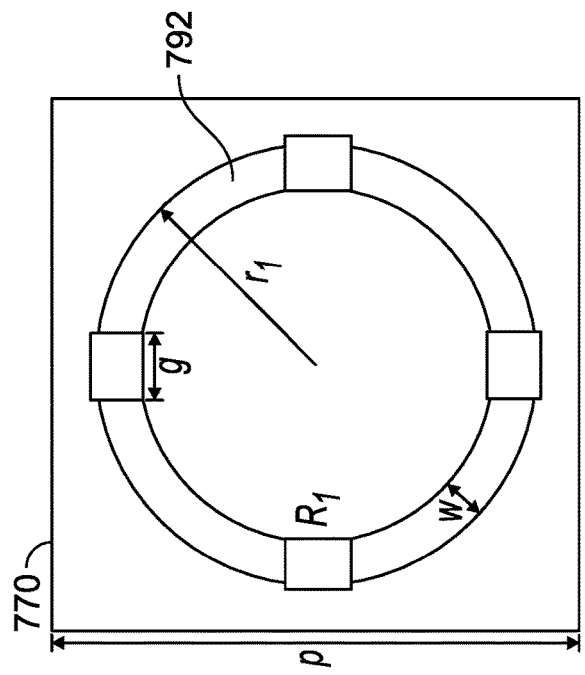
Figure 7C:
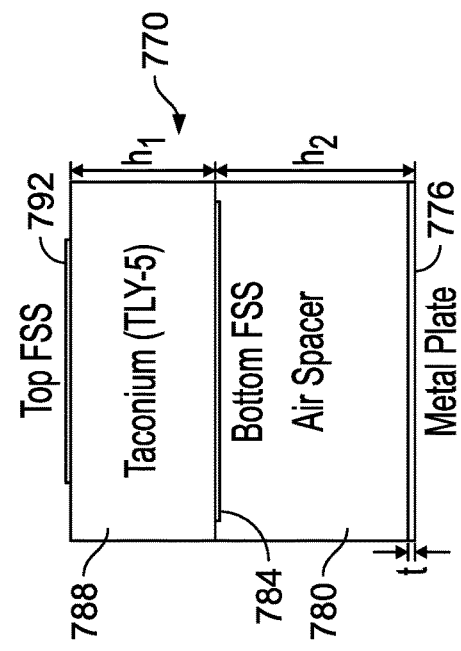
Figure 8B:
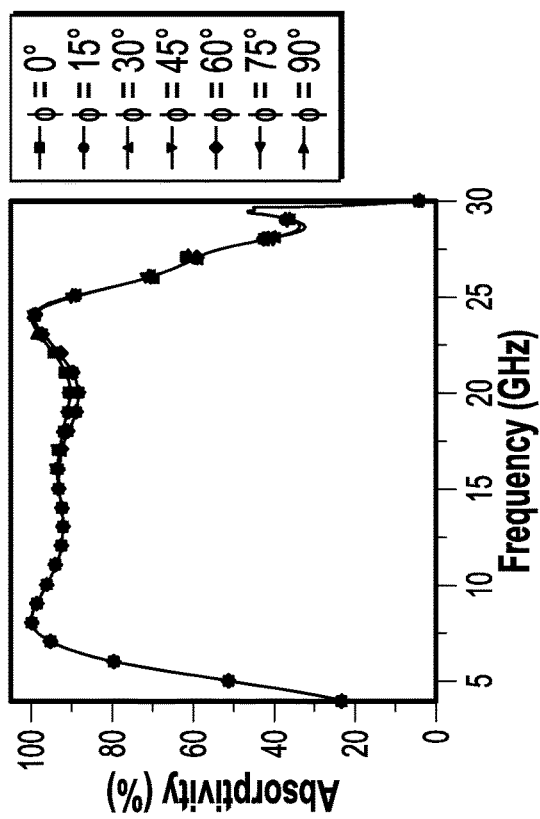
FIGS. 8A-8D illustratively depict a simulated reflectance graph, and normal and oblique incidence angular stability of a dual-circular circuit analog absorber in accordance with an aspect of the disclosure.
Figure 8D:
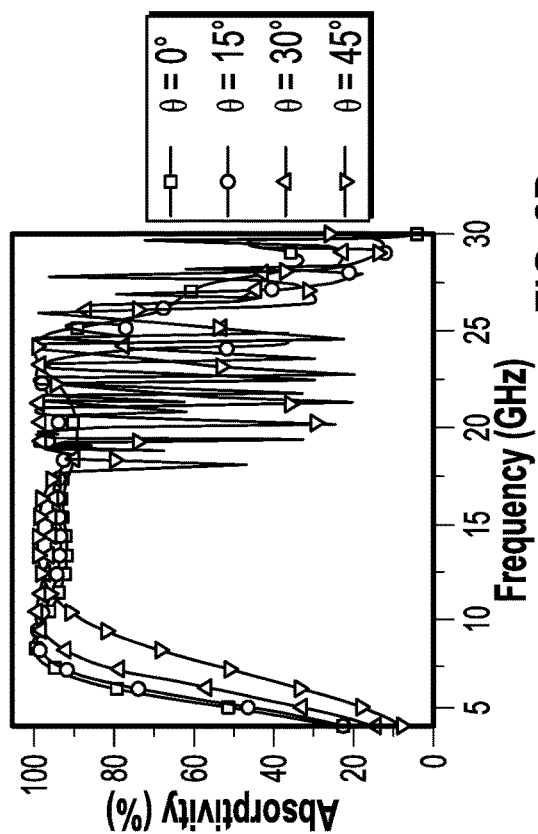
Figure 8A:
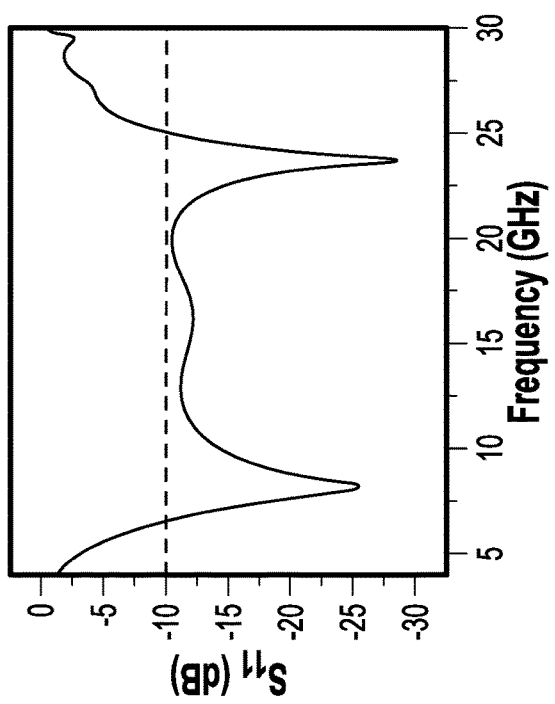
Figure 8C:
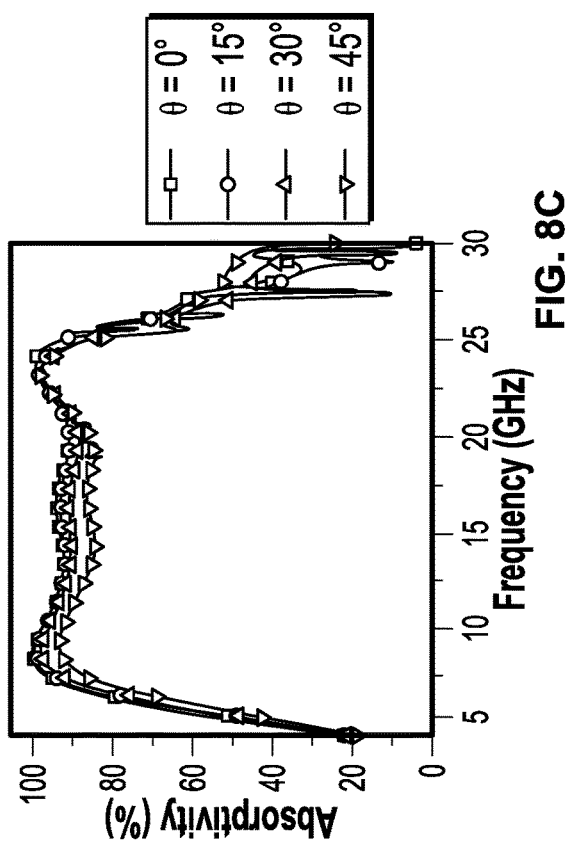

FIGS. 7A-7C disclose another example of a broadband absorber 770 in accordance with an aspect of the disclosed technology. As shown in these drawings, absorber 770 comprises a ground plane 776, an air spacer 780, a first or bottom FSS 784, a Taconium layer 788, and a second or top FSS layer 792.

The ground plane 776 may comprise a metal plate and forms a base in a stacking direction for other parts of absorber 770. The metal plate may comprise a copper coated plate having a thickness of 35 microns with a conductivity $\sigma = 5.8 \times 10^7$ S/m. Above the ground plane 776 is an air spacer 780. Air spacer 780 may comprise one or more nylon screws or one or more foam structures. In some examples, the relation between $h_1$ and $h_2$ are as follows $h_2 \approx 2h_1$, $h_1 \approx 43.4t$, where $h_1 = 1.52$ mm, $h_2 = 2.8$ mm. A first or bottom FSS 784 is positioned above the air spacer 780 and metal plate 776. The bottom FSS 784 comprises at least a portion of an upper boundary of the air spacer or air gap region 780.

A Taconium layer 788 is arranged above the bottom or first FSS 784. The Taconium layer extends in a lateral direction beyond a region occupied by bottom FSS 784, as shown in FIG. 7C, and may be arranged on FSS 784. Second or top FSS 792 is positioned above Taconium layer 788 in the stacking direction. The Taconium layer 788 may comprise TLY-5 type materials and comprises a substrate onto which both the top and bottom FSSs 784 and 792 may be mounted.

First FSS 784 and second FSS 792 may each comprise a ring or circular pattern, which includes a plurality of lumped resistors. FIG. 7A shows the ring configuration of the second or top FSS 792. In FIG. 7A, the ring is of radius $r_1$ and four resistors R1 are placed equidistant apart, e.g., every 90 degrees, along the circumference of the ring. FIG. 7B shows the ring configuration of the first or bottom FSS 784. In FIG. 7B, the ring is formed by a radius $r_2$ and four resistors R2 are placed equidistant apart, e.g., every 90 degrees, along the circumference of the ring. As depicted in the drawings, $r_2$ is greater than $r_1$.

In some examples, the radius of the top FSS ($r_1 = 0.0809 \lambda_L$) and bottom FSS ($r_2 = 0.0984 \lambda_L$) are in the ratio $r_1/r_2 = 0.822$. The ratio of substrate 788 and air spacer thickness may be $h_1/h_2 = 0.542$. In some examples, the ratio of ring radii with the unit cell periodicity may be the ratio $r_1/p = 0.389$, and $r_2/p = 0.473$. In addition, the width (w) of the circular ring is maintained as $w/r_1 = 0.108$, and $w/r_2 = 0.088$. Further, the gap (g) for the housing of chip resistors may be maintained as $w/g = 0.8$.

In other examples, the ratio of chip resistors values used for the top and bottom circular rings are in 1:1 ratio. Further, the ratio of the unit cell periodicity to heights of the substrate and air-spacer are related by $p/h_1 = 6.25$, $p/h_2 = 3.39$, and $p/(h_1+h_2) = 2.199$.

An absorber implemented in accordance with FIG. 7 may demonstrate 90% minimum absorptivity over the frequency range from 6.56 GHz to 25 GHz covering entire X, Ku, and Ka-bands with 18.44 GHz (116.8% FNBW) state of the art performance as depicted in Table 3 and shown in FIG. 8. In addition, the unit cell is compact with periodicity $0.207 \lambda_L$, and $0.09 \lambda_L$, as depicted in Table 3, where $\lambda_L$ is the wavelength, corresponds to the lowest frequency of the absorption band.

TABLE 3

| Year | Periodicity (in $\lambda_L$) | Oblique Stability | Centre Frequency (GHz) | Bandwidth (GHz) | FBW (%) | No of Resistors per unit cell |
|---|---|---|---|---|---|---|
| 2019 | 0.1373 | 60° | 13.21 | 10.58 | 80.09 | 4 |
| 2016 | 0.2149 | 45° for | 11.59 | 13.26 | 114.41 | 12 |

TABLE 3-continued

| Year | Periodicity (in $\lambda_L$) | Oblique Stability | Centre Frequency (GHz) | Bandwidth (GHz) | FBW (%) | No of Resistors per unit cell |
|---|---|---|---|---|---|---|
| | | TE | | | | |
| 2015 | 0.4139 | 30° | 12.67 | 7.60 | 59.98 | 8 |
| 2014 | 0.3172 | 20° | 12.55 | 9.25 | 73.68 | 8 |
| 2018 | 0.4237 | 60° | 10.80 | 5.20 | 48.15 | 8 |
| 2020 | 0.2070 | 45° for TE 30° for TM | 15.78 | 18.44 | 116.8 | 8 |

Table 3 shows the performance of an absorber designed in accordance with aspects of the disclosed technology discussed in relation to absorber 770 (row "2020") relative to the performance of other absorbers from 2014 through 2019.

In operation, the above absorbers 100, 400, and 770 work as follows. When an EM wave is incident on a metasurface, there is the possibility of reflection, transmission, and absorption of energy. The size of a unit cell (nearly $0.5\lambda_g$) is arranged such that the refraction phenomena dominate over diffraction and scattering. The overall structure is terminated with ground to ensure zero transmission of energy. The incident electric field induces an oscillatory surface current on the top metal layer, and these currents are substantially amplified at the resonant frequency. The tangential magnetic field develops the anti-parallel current in the top and bottom surfaces of the ground plane, which constitutes dielectric or magnetic resonance. At resonance, the impedance seen by an EM wave is purely real, and is dissipated as heat. Dielectric loss due to the magnetic resonance is majorly contributing in EM absorption. Due to the resonant behaviour, the absorption is done for narrow bandwidth. The bandwidth can be improved by including more losses (ohmic loss) using external lumped elements (e.g., chip resistors).

FIGS. 9A-9C depict a converter 700 in accordance with an aspect of the disclosed technology. FIGS. 10A-10D and 11A-11B show performance metrics associated with the converter 700. Converter 700 includes a ground plane 710, a dielectric substrate 720, and metasurface 730. The dielectric substrate 720 is placed over ground plane 710, and metasurface 730 is positioned on dielectric substrate 720. An H-shaped FSS 750 is positioned above or on, or formed onto, metasurface 730. Converter 700 comprises a single-layered reflective type converter.

Top or H-shaped FSS 750 is separated at $\lambda_g/4$ from the ground plane so to allow for conversion of the linearly polarized electromagnetic wave to its orthogonal polarization effectively over a broadband frequency range, where $\lambda_g$ is the guided wavelength corresponding to the centre frequency of the broadband. As shown in FIGS. 9A and 9C, FSS 750 includes length S3 extending in a lengthwise direction and a width comprising $w_4$, $w_3$ and $w_4$, extending in a widthwise direction. FSS 750 also includes a notch 752 along each width. Notches 752 have a depth of 16 in the lengthwise direction and a width of $w_3$ as shown.

Figure 10A:
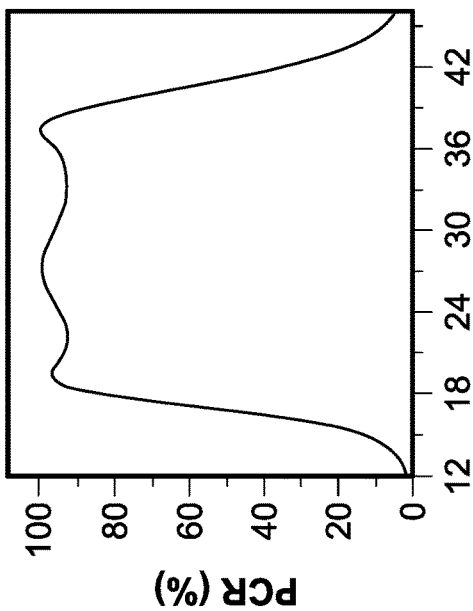
FIGS. 10A-10D illustratively depict simulated S-parameters of one or more H-shaped polarization converters along with angular stability curves in accordance with an aspect of the disclosure.
Figure 10B:
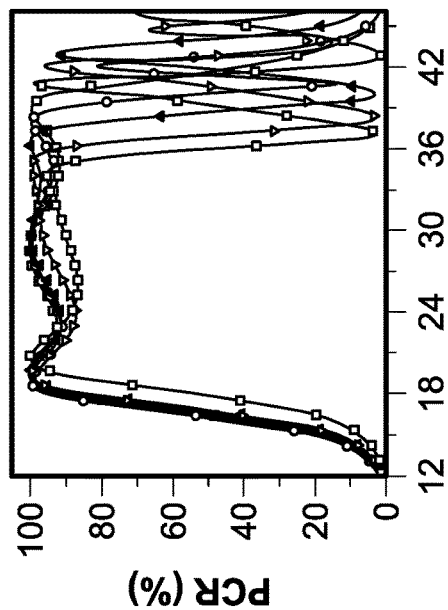
Figure 10C:
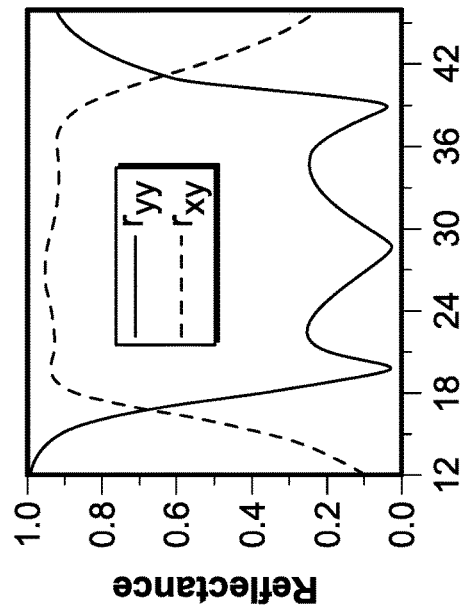
Figure 10D:
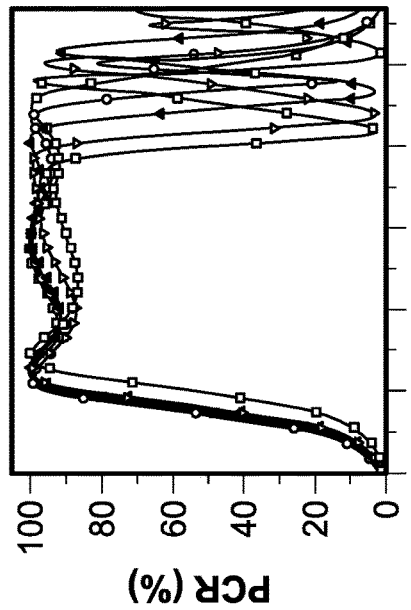

Metasurface 730 is generally of a quadrilateral shape with four sides and four vertices or corners. In some examples, each side of metasurface 730 may be a length p3 to form a square structure. FSS 750 is positioned at 45 degrees relative to the vertices of metasurface 730. This causes FSS 750 to encounter the artificial anisotropy for the incoming electromagnetic wave.

Where the widths $w_3$ and $w_4$ are selected such that $w_3=(3/5) w_4$, PCR response is improved and may be optimized. Converter 700 may provide 90% polarization conversion ratio over the bandwidth of 22.26 GHz (from 17.97 GHz to 40.23 GHz) as depicted in FIG. 10B and Table 4. In addition, converter 700 exhibits angular stability for both TE and TM incidence up to 40° with a PCR bandwidth reduction of 29.40% (TE) and 31.40% (TM) in comparison with a normal incidence as depicted in Table 4.

TABLE 4

| Substrate Used | Centre Frequency (GHz) | 90% PCR BW (GHz) @ Normal Incidence | 90% PCR BW (GHz) @ Highest Oblique Angle | BW Oblique Angle Stability (°) | BW Reduction (%) | No. of Layers Used |
|---|---|---|---|---|---|---|
| Teflon | 15.60 | 15.20 | NA | NA | NA | Single |
| PTFE | 16.74 | 15.94 | NA | NA | NA | Single |
| FR-4 | 20.80 | 15.56 | NA | NA | NA | Single |
| RT Duroid | 13.90 | 18.20 | 11.00 | Up to 40° | 39.60 | Dual Layer (Superstrate) |
| RT Duroid | 16 | 17.00 | NA | Up to 30° | NA | Single |
| FR-4 | 4.85, 11.52 | 0.90, 4.15 | NA | NA | NA | Single |
| This Work: FR-4 | 29.1 | 22.26 | 15.70 (TE) 15.27 (TM) | Up to 40° | 29.40 (TE) 31.40 (TM) | Single |

Table 4 shows the performance of a converter designed in accordance with aspects of the disclosed technology discussed in relation to converter 700 (row "This work: FR-4") relative to the performance of other absorbers from 2015 and 2019.

FIGS. 12A-12C depict a converter 1000 in accordance with an aspect of the disclosed technology. FIGS. 13A-13D and 14A-14D show performance metrics associated with the converter 1000. Converter 1000 includes a ground plane 1010, a dielectric substrate 1020, and metasurface 1030. The dielectric substrate 1020 is placed over ground plane 1010, and metasurface 1030 is positioned on dielectric substrate 1020. A meander line FSS 1050 is positioned or formed onto metasurface 1030. Converter 1000 may be a single-layered reflective type converter.

As shown, meander line FSS 1050 extends a length S1 at a 45° angle relative to the vertices of metasurface 1030 to experience the artificial anisotropy of the incoming electromagnetic wave. The FSS 1050 forms an asymmetric pattern that includes sections having different widths (w'1, w'3, w'4) extending in the lengthwise direction, as well as width w'1 in a width wise direction. In some examples, w'3=2*w'1. In other examples, w'1=2*w'3. Yet still, in other examples w'3=2*w'1 and w'2=3*w'1. The asymmetry of the meandering line takes advantage of the artificial chirality property since is not symmetric about any axis in the plane parallel with metasurface. The meandering line also works to shift the destructive interference created via the additional path travelled by the electromagnetic wave to the higher frequency region outside the operating band. In some examples, the lowest width (w'1) of the meander line and the gap-width are equal. In addition, in some examples, the total length of the meander line s'1=2*periodicity of the unit cell. $p_2$ indicates the length and width dimensions of substrate 1020.

In other examples, performance may be particularly improved and considered optimized when the dimension of the metallic portion in the unit cell is such that $s_1'=3*w_4'$. Such a configuration is illustrated in FIG. 12A. In addition, converters such as converter 1000 will typically be compact with a periodicity $\lambda_o/13.69$ and thickness $\lambda_o/5.98$, where $\lambda_o$ is the wavelength corresponds to the lowest frequency of the operating band.

Figure 13A:
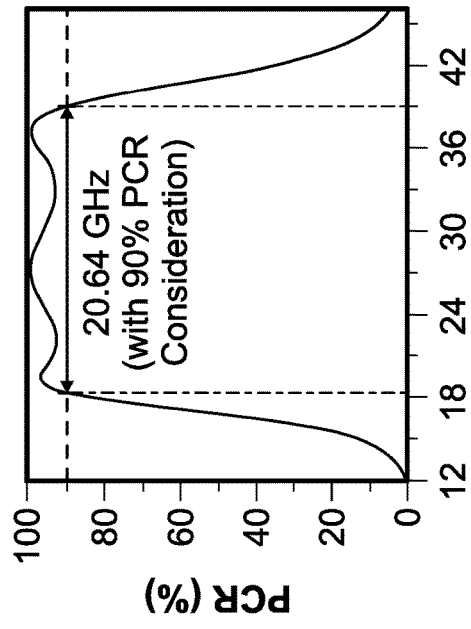
FIGS. 13A-13D illustratively depict simulated S-parameters of one or more meander line shaped polarization converters along with angular stability curves in accordance with an aspect of the disclosure.
Figure 13B:
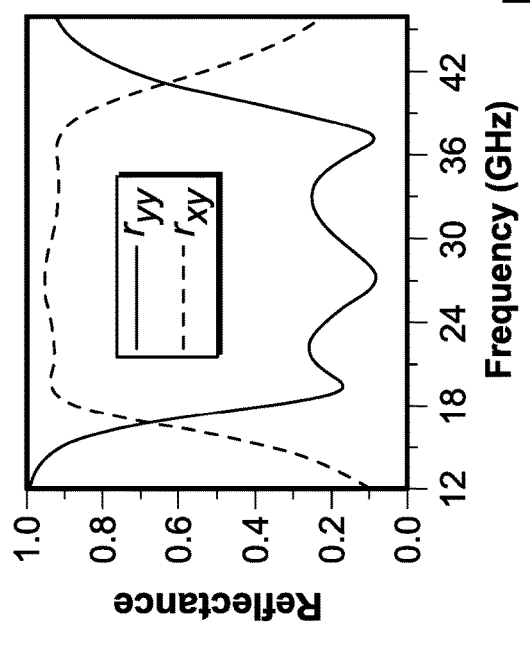
Figure 13C:
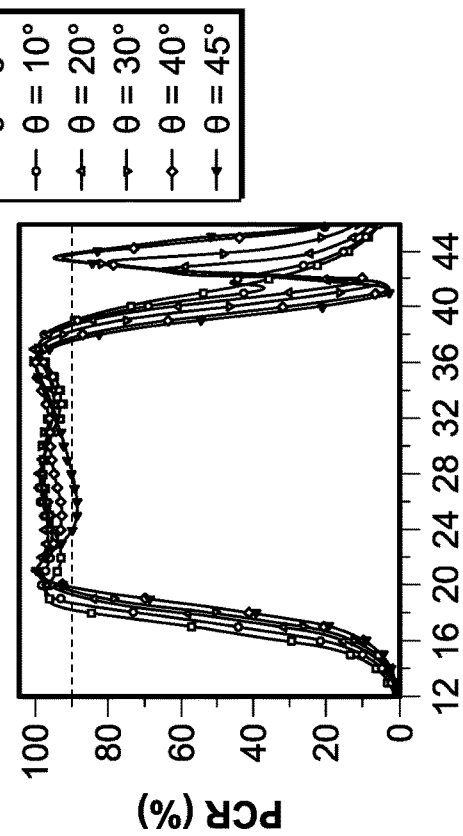
Figure 13D:
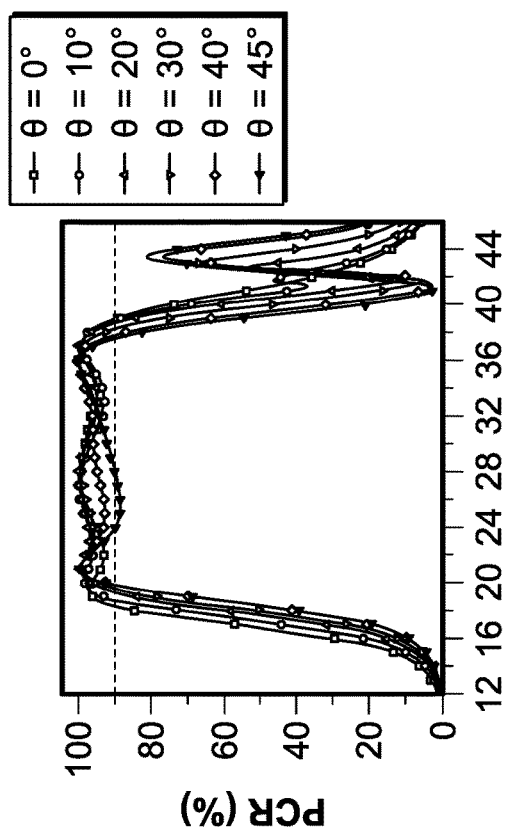

In some examples, converter 1000, FSS 1050 is separated at $\lambda_g/4$ from ground plane 1010. In addition, in some examples, the unit-cell periodicity may be set near to or to $0.5\lambda_H$, where $\lambda_H$ is the wavelength corresponds to the highest frequency of the operating band. Converter 1000 may exhibit a 90% polarization conversion ratio over the bandwidth of 20.64 GHz (from 18.31 GHz to 38.95 GHz) as depicted in FIG. 13B and Table 5. It may also exhibit an angular-stable response for both TE and TM incidence up to 43° with a PCR bandwidth reduction of only 14.24% (TE) and 15.72% (TM) in comparison with a normal incidence as depicted in Table 5.

Although different aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. A broadband electromagnetic absorber, comprising:
   an electrically-conductive ground plane;
   a first dielectric substrate arranged above the electrically-conductive ground plane in a stacking direction;
   a second dielectric substrate arranged above the first dielectric substrate in the stacking direction;
   an air gap between the first dielectric substrate and the second dielectric substrate that separates the first dielectric substrate from the second dielectric substrate;
   a first frequency selective surface (FSS) comprising a plurality of lumped resistors, the first FSS being arranged on the second dielectric substrate; and
   a second frequency selective surface (FSS) arranged on the first dielectric substrate between the first dielectric substrate and the second dielectric substrate, wherein the plurality of lumped resistors are arranged along a periphery of the second dielectric substrate.

TABLE 5

| Ref. | Substrate Used | Centre Frequency (GHz) | 90% PCR BW (GHz) @ Normal Incidence | 90% PCR BW (GHz) @ Highest Oblique Angle | Oblique Angle Stability (°) | BW Reduction (%) | No. of Layers Used |
|---|---|---|---|---|---|---|---|
| [14] | Teflon | 15.60 | 15.20 | NA | NA | NA | Single |
| [15] | PTFE | 16.74 | 15.94 | NA | NA | NA | Single |
| [16] | FR-4 | 20.80 | 15.56 | NA | NA | NA | Single |
| [17] | RT Duroid | 13.90 | 18.20 | 11.00 | Up to 40° | 39.60 | Dual Layer (Superstrate) |
| [18] | RT Duroid | 16 | 17.00 | NA | Up to 30° | NA | Single |
| [19] | FR-4 | 4.85, 11.52 | 0.90, 4.15 | NA | NA | NA | Single |
| This work | FR-4 | 28.63 | 20.64 | 17.70 (TE) 17.63 (TM) | Up to 43° | 14.24 (TE) 15.72 (TM) | Single |

Table 5 shows the performance of a converter designed in accordance with aspects of the disclosed technology discussed in relation to converter 100 (row "This work: FR-4") relative to the performance of other absorbers from 2015 and 2019.

In operation, the above converters operate as follows. When a linearly polarized (vertically or horizontally) EM wave is incident on the anisotropic metasurface (tilted at 45° with the x-y plane), the electric field component can be treated as the sum of two orthogonal components. Due to the anisotropy involved in the structure, the co-polarization reflection component is reduced and the cross-polarization component is nearly equal to unity over the operating bandwidth. If the magnitude of the reflection coefficient of these orthogonal components is near unity with 180° relative phase shift between them, then the reflected EM wave would be orthogonally polarized concerning the incident wave. The overall structure is terminated with the ground to ensure zero energy transmission, since the reflecting-type polarization converter is inherently broadband. The thickness of the substrate is chosen such that $\lambda_g/4$ of the centre frequency. The plasmonic resonances (electrical and magnetic resonances) are responsible for the broadband behaviour; this can be established via a surface current distribution analysis.

2. The broadband electromagnetic absorber of claim 1, wherein the air gap is arranged between the second FSS and the first dielectric substrate.

3. The broadband electromagnetic absorber of claim 1, wherein the second FSS comprises an inductive grid.

4. The broadband electromagnetic absorber of claim 1, wherein the first FSS is arranged along the periphery of the second dielectric substrate and comprises a quadrilateral shape.

5. The broadband electromagnetic absorber of claim 1, wherein the air gap is created with one or more nylon screws or one or more foam structures.

6. The broadband electromagnetic absorber of claim 1, wherein the first FSS comprises a cross-loop surface having a plurality of inner loops and a plurality of outer loops.

7. The broadband electromagnetic absorber of claim 6, wherein the plurality of lumped resisters are arranged on the plurality of outer loops.

8. The broadband electromagnetic absorber of claim 6, wherein the plurality of outer loops correspond to a first resonance frequency and the plurality of inner loops correspond to a second resonance frequency.

9. The broadband electromagnetic absorber of claim 8, the first resonance frequency is higher than the second resonance frequency.

10. The broadband electromagnetic absorber of claim 1, wherein each substrate of the first dielectric substrate and the second dielectric substrate is separated from the electrically-conductive ground plane so as to cause the ground plane to absorb electromagnetic energy over a range of frequencies.

11. The broadband electromagnetic absorber of claim 10, wherein the range of frequencies comprises 2 GHz to 6 GHz.

12. The broadband electromagnetic absorber of claim 1, wherein the air gap is created by an air spacer.

* * * * *